US010298880B2

(12) United States Patent
Okuyama et al.

(10) Patent No.: US 10,298,880 B2
(45) Date of Patent: May 21, 2019

(54) COMMUNICATION MANAGEMENT SYSTEM, COMMUNICATION SYSTEM, COMMUNICATION MANAGEMENT METHOD, AND MEDIUM

(71) Applicants: Taro Okuyama, Tokyo (JP); Junichi Wada, Kanagawa (JP)

(72) Inventors: Taro Okuyama, Tokyo (JP); Junichi Wada, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/745,560

(22) PCT Filed: May 16, 2016

(86) PCT No.: PCT/JP2016/002381
§ 371 (c)(1),
(2) Date: Jan. 17, 2018

(87) PCT Pub. No.: WO2017/013820
PCT Pub. Date: Jan. 26, 2017

(65) Prior Publication Data
US 2018/0213183 A1 Jul. 26, 2018

(30) Foreign Application Priority Data
Jul. 23, 2015 (JP) ................. 2015-145701

(51) Int. Cl.
H04M 3/51 (2006.01)
H04M 3/56 (2006.01)
(Continued)

(52) U.S. Cl.
CPC ......... H04N 7/147 (2013.01); H04L 65/1046 (2013.01); H04L 65/1069 (2013.01);
(Continued)

(58) Field of Classification Search
CPC combination set(s) only.
See application file for complete search history.

(56) References Cited

U.S. PATENT DOCUMENTS 8,850,033 B2  9/2014 Umehara et al.
9,596,434 B2  3/2017 Inoue
(Continued)

FOREIGN PATENT DOCUMENTS

JP   2-246688 A    10/1990
JP   2005-064860   3/2005
(Continued)

OTHER PUBLICATIONS

RFC 3261—SIP—Internet Society—Jun. 2002.*
(Continued)

Primary Examiner — Phung-Hoang J Nguyen
(74) Attorney, Agent, or Firm — Oblon, McClelland, Maier & Neustadt, L.L.P.

(57) ABSTRACT

At an actual reception counter, a person in charge of reception can see looks and belongings of a visitor, and may guess a business of the visitor before the visitor reaches the reception counter. However, in communication between communication terminals, there is a problem about usability such that contents on one side cannot be confirmed on a communication terminal on the other side before requesting for communication. To solve the problem, the session control unit 58 of a management system 50 executes, when communication has been established between one or more communication terminals 10 on a customer side and communication terminals 10 on an operator side, control for starting transmission of content data of the communication terminals 10 on the customer side to the communication terminals 10 on the operator side. Based on a start command from the terminal 10 on the operator side, the session control unit 58 of the management system 50 executes control for
(Continued)

starting transmission of content data of the communication terminals 10 on the customer side.

9 Claims, 22 Drawing Sheets

(51) Int. Cl.
    *H04N 7/14* (2006.01)
    *H04N 7/15* (2006.01)
    *H04L 29/06* (2006.01)

(52) U.S. Cl.
    CPC ............ *H04L 65/403* (2013.01); *H04M 3/51* (2013.01); *H04M 3/567* (2013.01); *H04N 7/15* (2013.01); *H04M 2201/50* (2013.01)

(56) References Cited

U.S. PATENT DOCUMENTS

| | | |
|---|---|---|
| 2005/0235033 A1 | 10/2005 | Doherty |
| 2007/0133774 A1 | 6/2007 | Fujimoto |
| 2010/0097438 A1 | 4/2010 | Ujii |
| 2013/0335511 A1* | 12/2013 | Maeda ..................... H04N 7/15 348/14.08 |
| 2014/0126555 A1* | 5/2014 | Mantri .................. H04L 1/1664 370/336 |
| 2017/0163696 A1 | 6/2017 | Inoue |

FOREIGN PATENT DOCUMENTS

| | | |
|---|---|---|
| JP | 2011-103685 A | 5/2011 |
| JP | 2012-191598 | 10/2012 |
| JP | 2017-022432 | 1/2017 |
| WO | WO 2016/035551 | 3/2016 |

OTHER PUBLICATIONS

International Search Report and Written Opinion dated Aug. 9, 2016 in PCT/JP2016/002381 filed on May 16, 2016.

Extended European Search Report dated Jun. 8, 2018 in Patent Application No. 16827389.4 citing references AA and AO—AP therein, 8 pages.

\* cited by examiner

[Fig. 1]
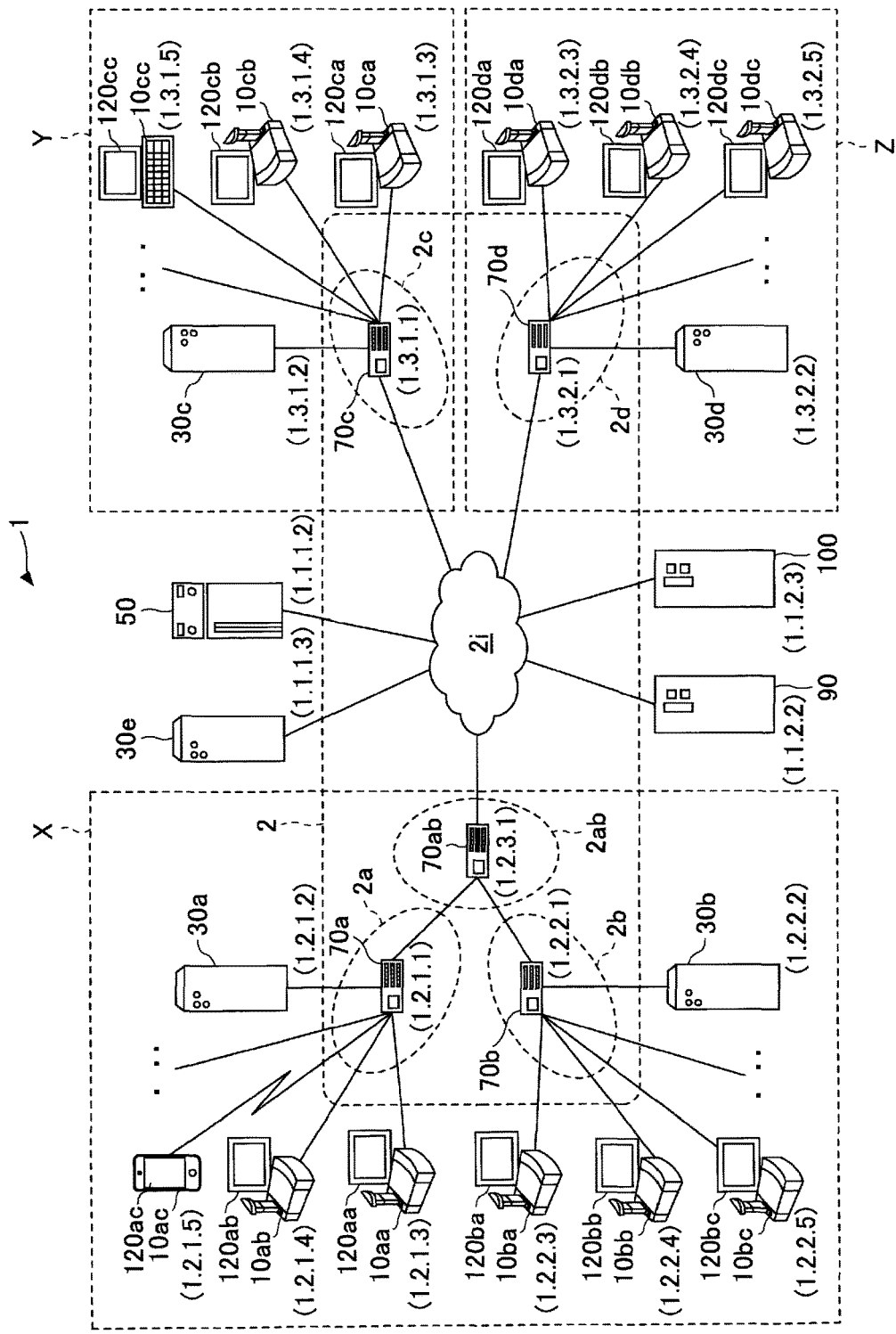

[Fig. 2]
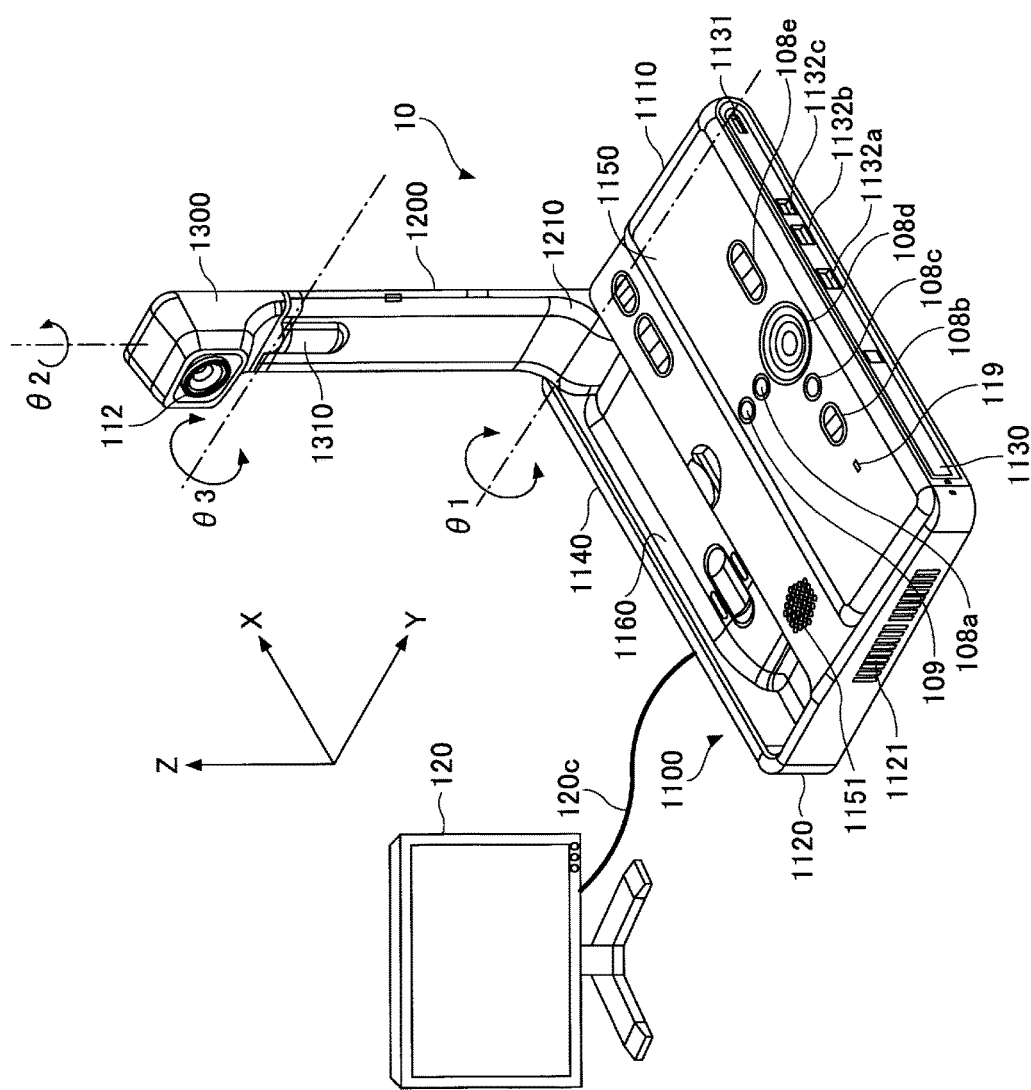

[Fig. 3]
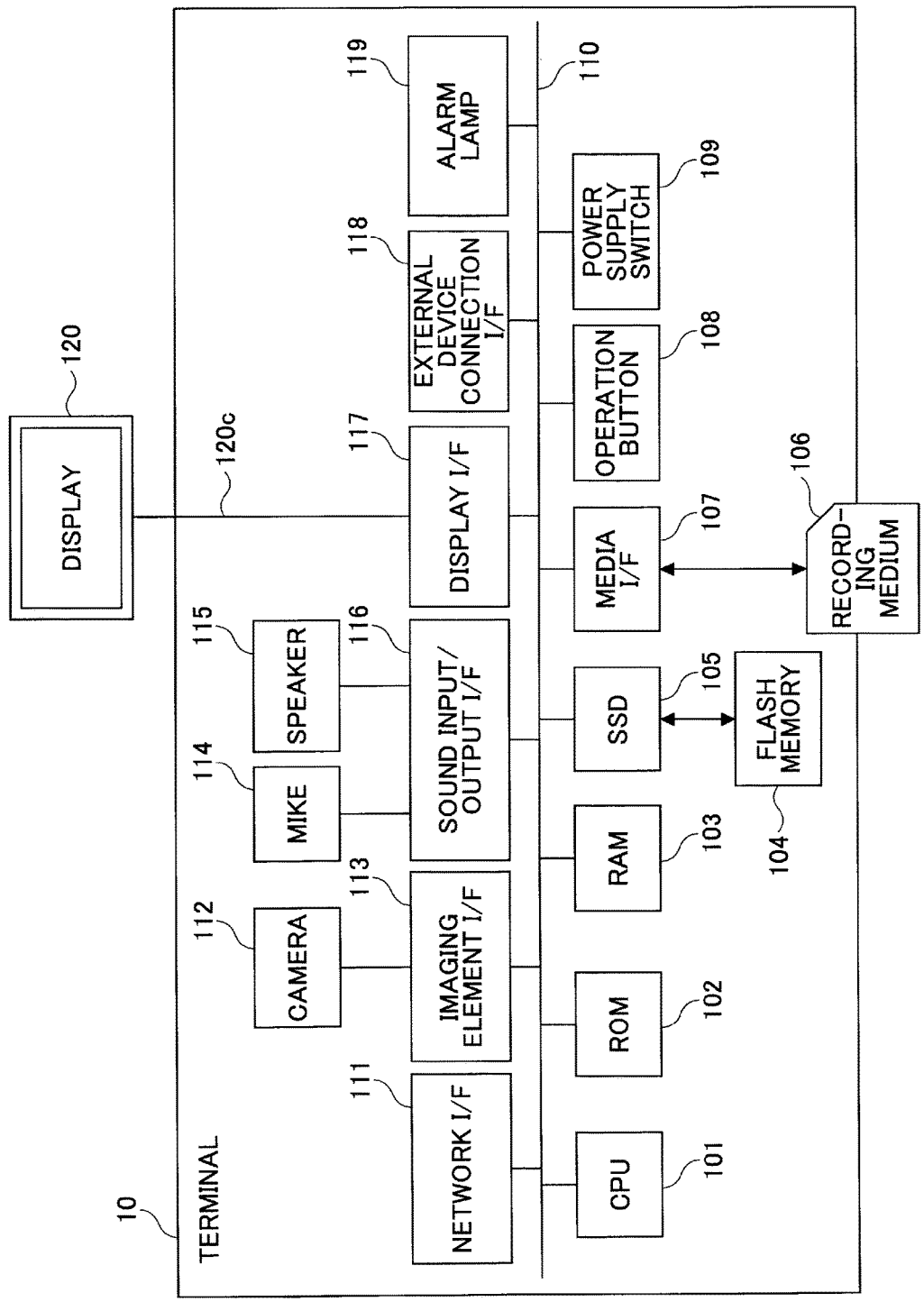

[Fig. 4]
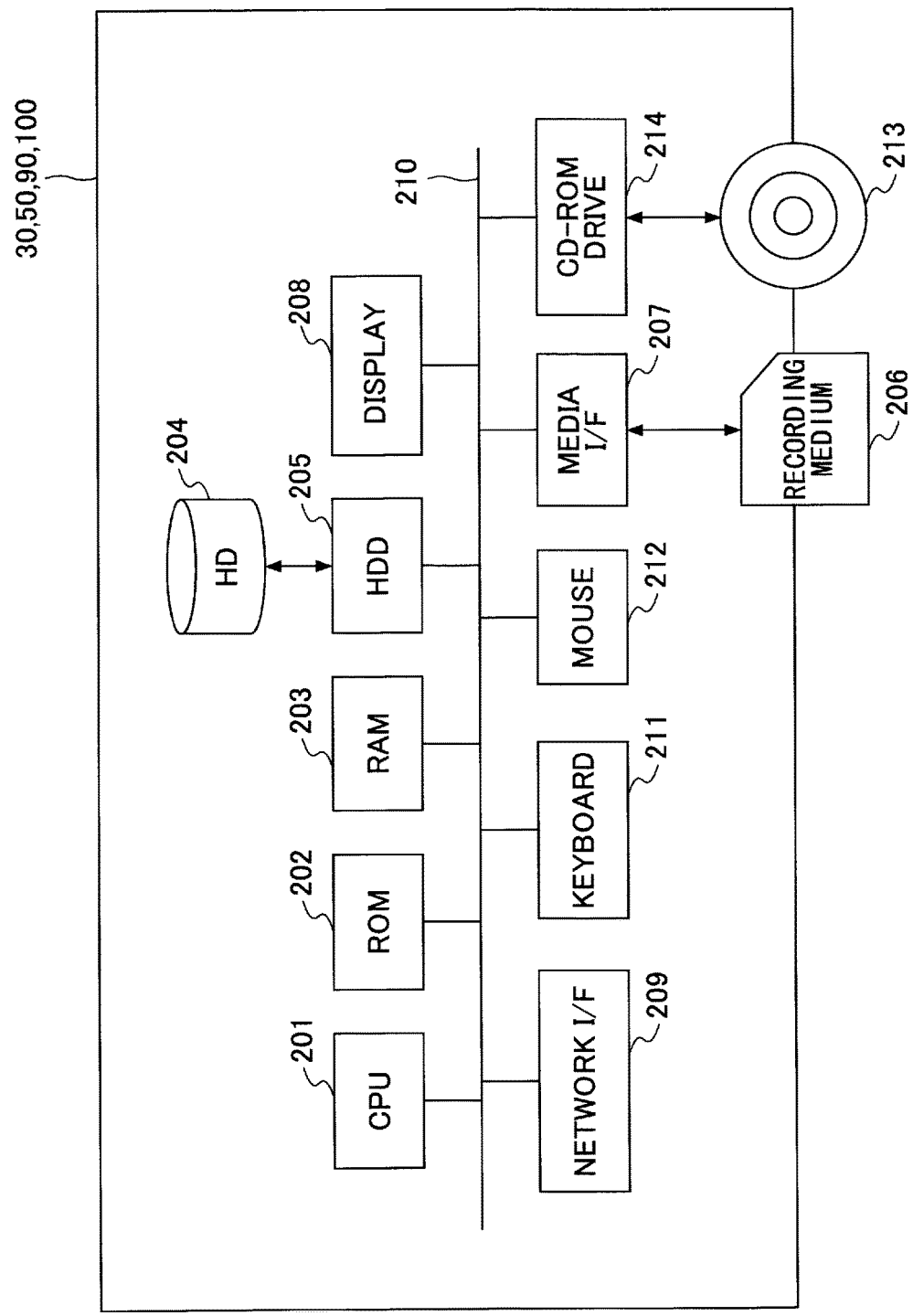

[Fig. 5]
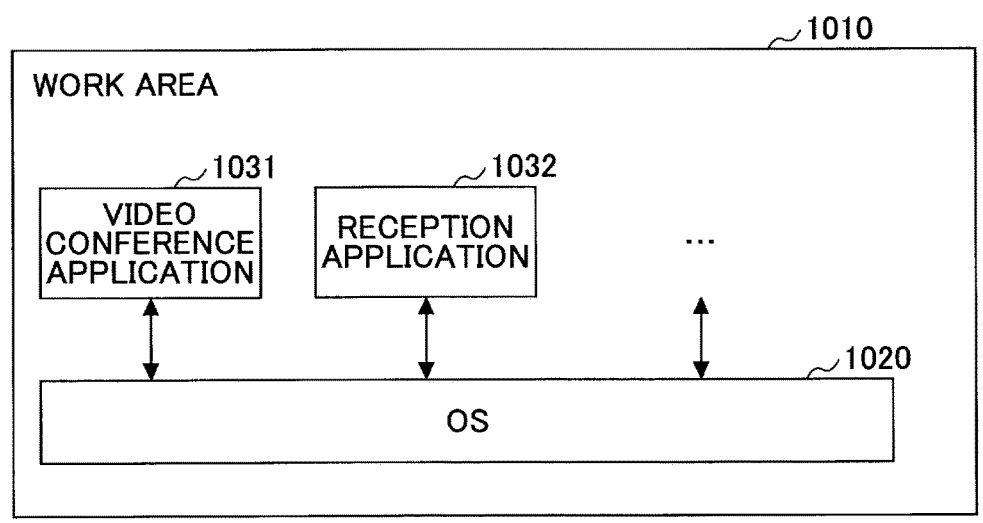

[Fig. 6]
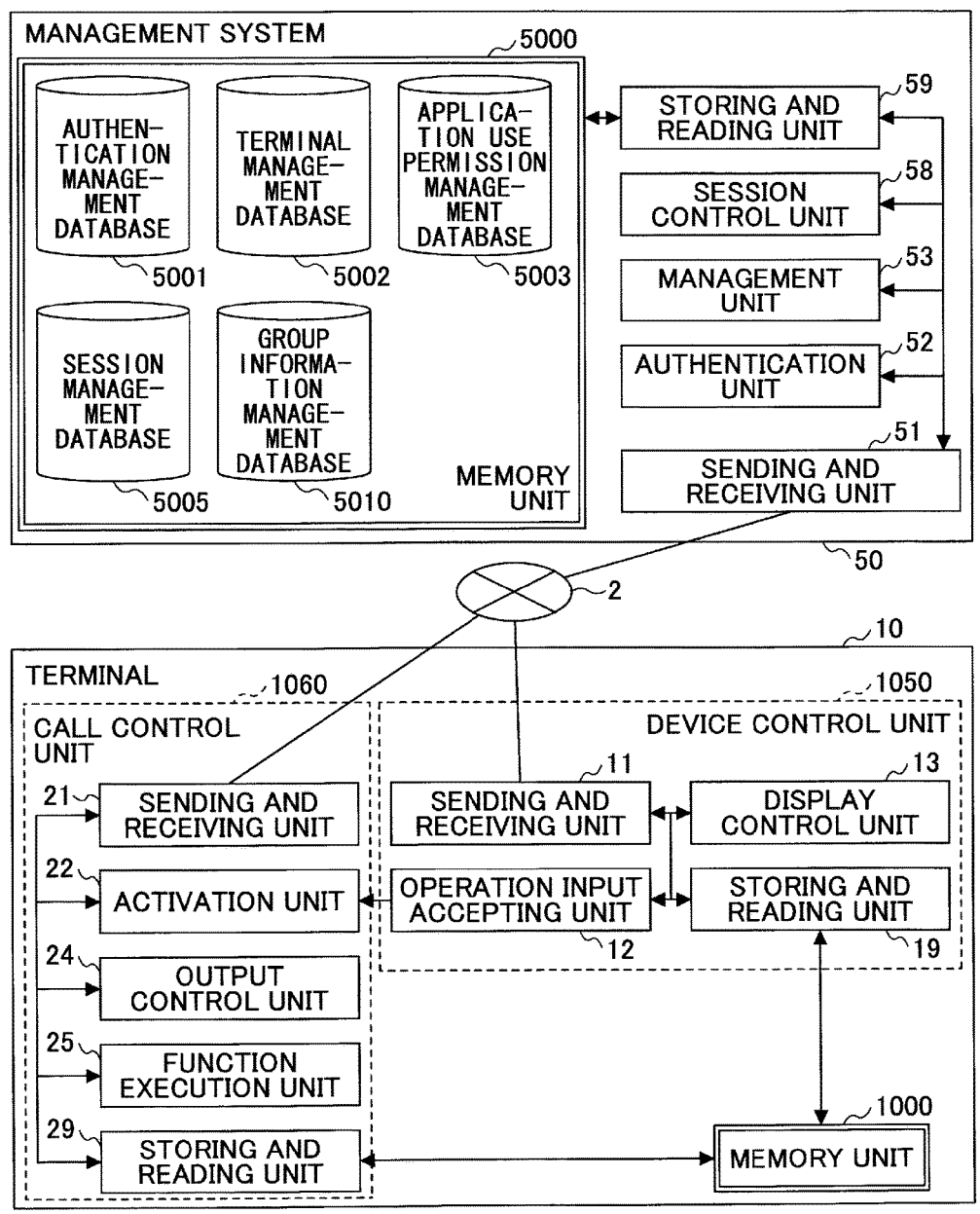

[Fig. 7A]

AUTHENTICATION MANAGEMENT TABLE

| COMMUNICATION ID | PASSWORD |
|---|---|
| 01aa | aaaa |
| 01ab | abab |
| 01ba | baba |
| ... | ... |

[Fig. 7B]

TERMINAL MANAGEMENT TABLE

| COMMUNICATION ID | DESTINATION NAME (TERMINAL NAME) | OPERATING STATE | IP ADDRESS OF TERMINAL |
|---|---|---|---|
| 01aa | TERMINAL AA | ONLINE (READY TO COMMUNICATE) | 1.2.1.3 |
| 01ab | TERMINAL AB | ONLINE (COMMUNICATING) | 1.2.1.4 |
| 01ac | TERMINAL AC | OFFLINE | 1.2.1.5 |
| 01da | CALL CENTER: TERMINAL DA | ONLINE (COMMUNICATING) | 1.3.2.3 |
| 01db | CALL CENTER: TERMINAL DB | ONLINE (COMMUNICATING) | 1.3.2.4 |
| ... | ... | ... | ... |

[Fig. 7C]

APPLICATION USE PERMISSION MANAGEMENT TABLE

| COMMUNICATION ID / APPLICATION ID | a001 | a002 | a003 | a004 |
|---|---|---|---|---|
| 01aa | On | On | ... | ... |
| 01ab | On | Off | ... | ... |
| 01ac | On | On | ... | ... |
| ... | ... | ... | ... | ... |

[Fig. 7D]

SESSION MANAGEMENT TABLE

| SESSION ID | RELAY APPARATUS ID | OPERATOR COMMUNICATION ID | CUSTOMER COMMUNICATION ID |
|---|---|---|---|
| se1 | 111e | 01xx | 01aa, 01ab |
| ... | ... | ... | ... |

[Fig. 7E]

GROUP INFORMATION MANAGEMENT TABLE

| GROUP COMMUNICATION ID | DESTINATION NAME (GROUP NAME) | CONSTITUTING TERMINAL COMMUNICATION ID |
|---|---|---|
| 01xx | CALL CENTER | 01da, 01db |
| ... | ... | ... |

[Fig. 8]
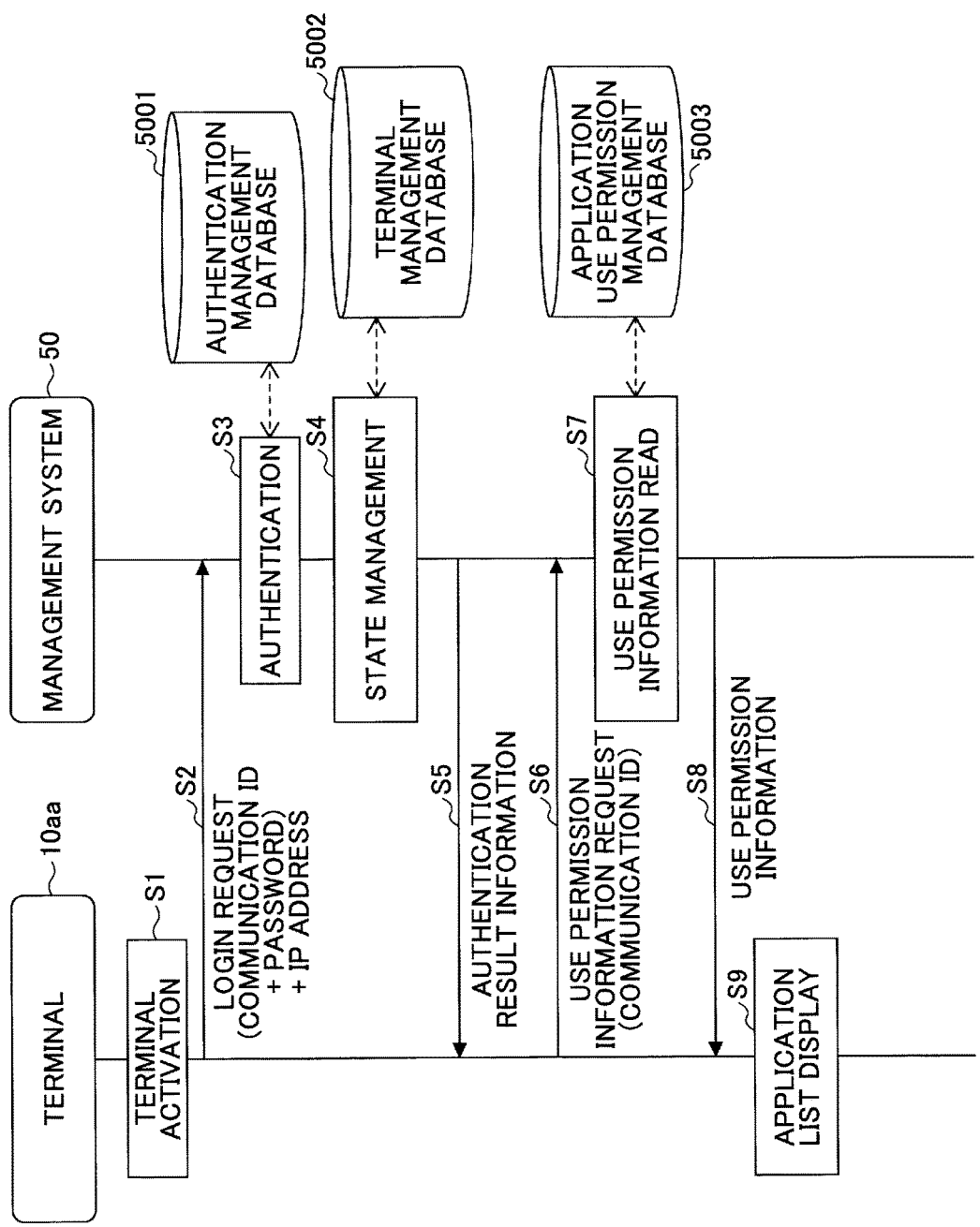

[Fig. 9]
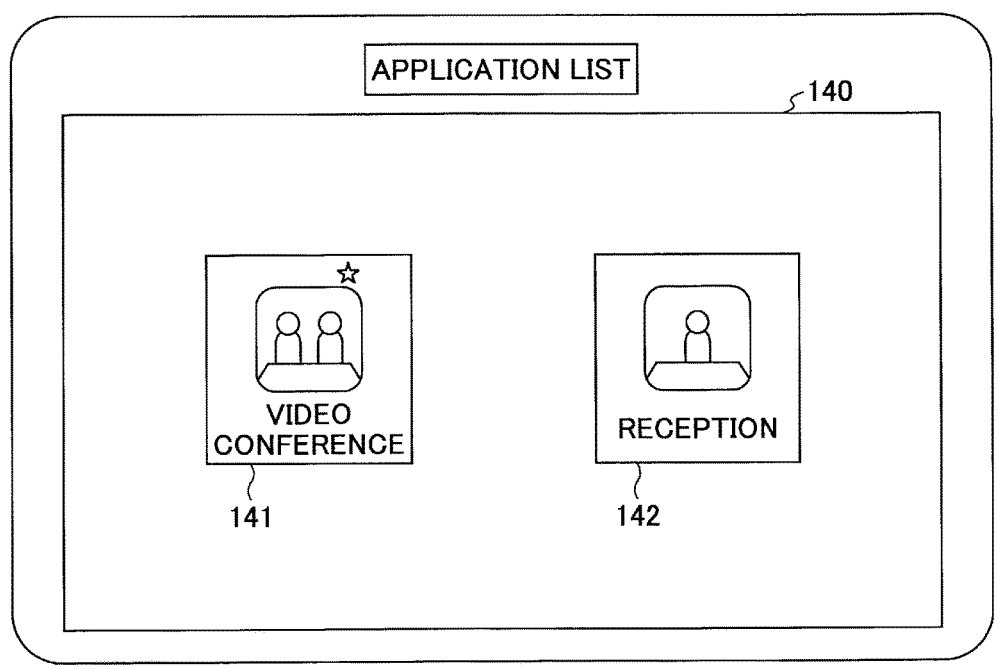

[Fig. 10]
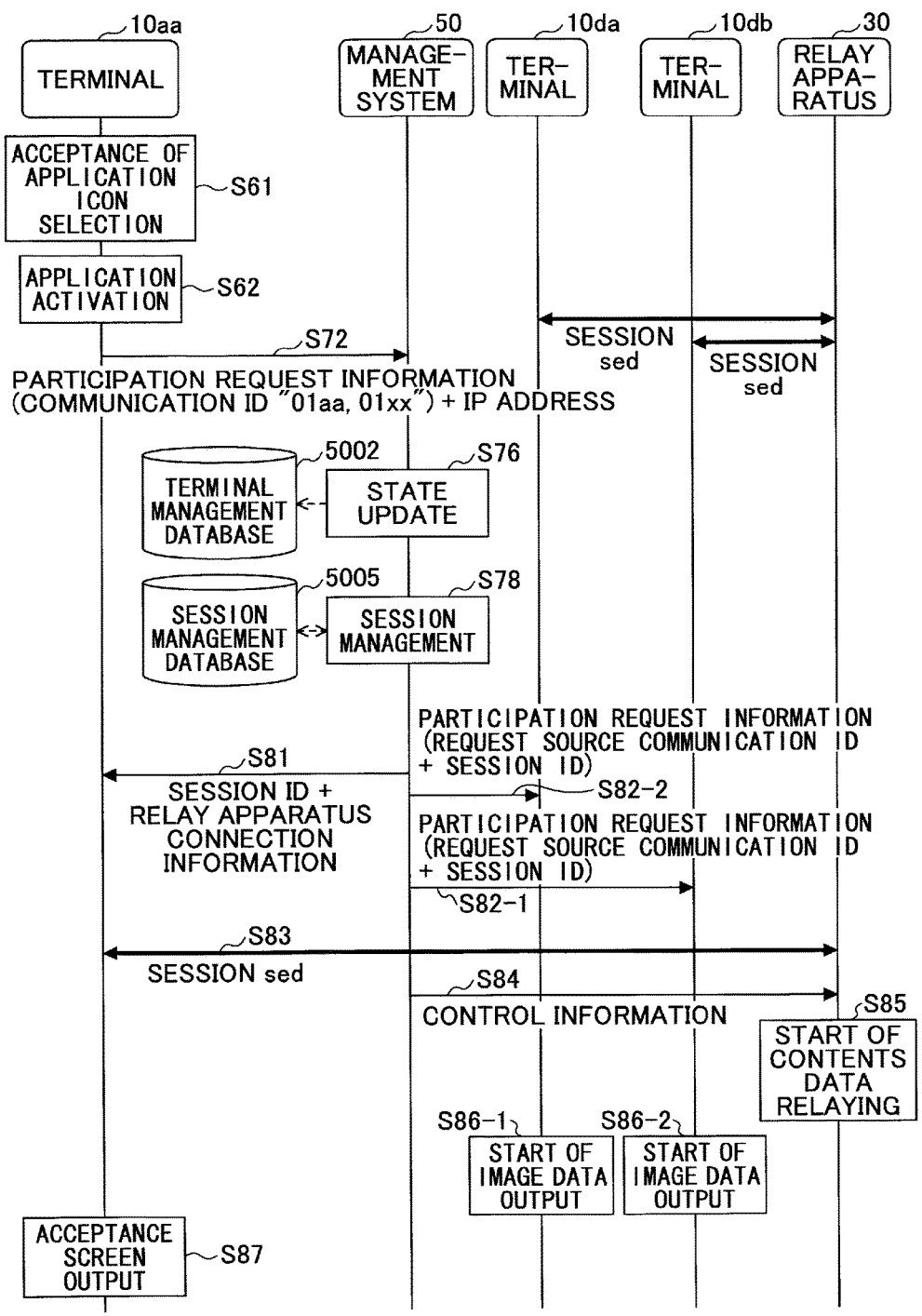

[Fig. 11A]
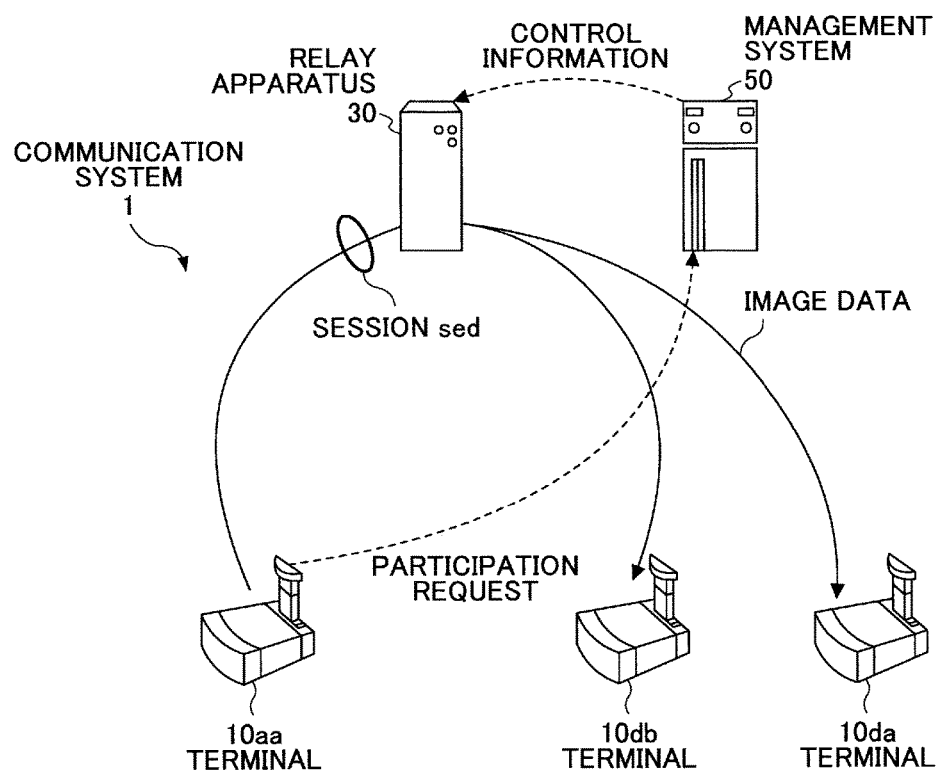

[Fig. 11B]
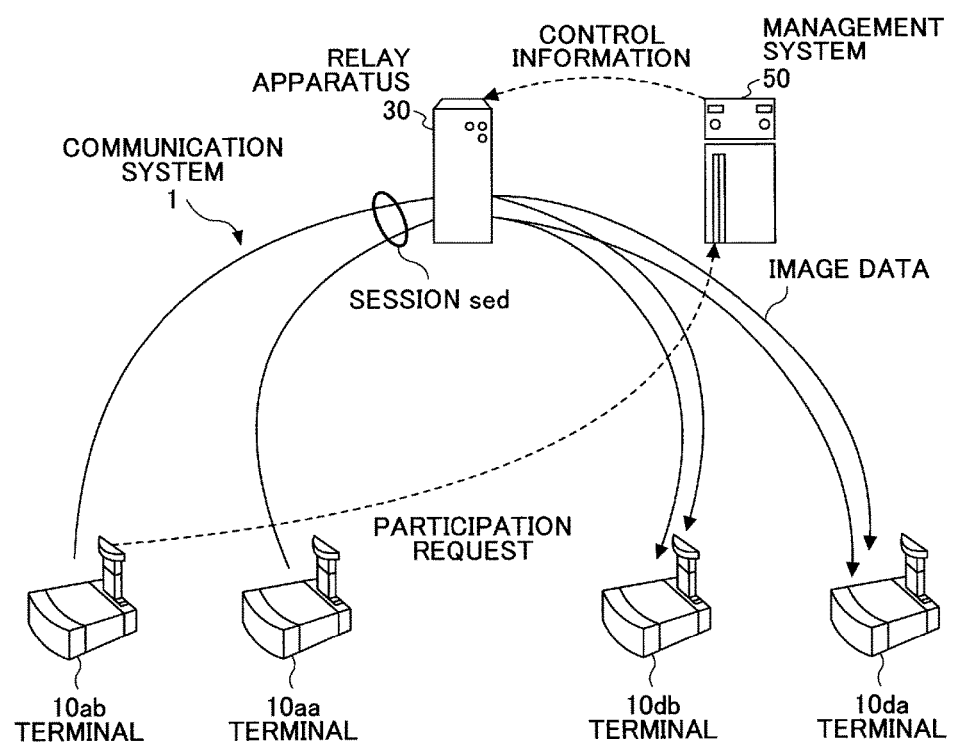

[Fig. 11C]
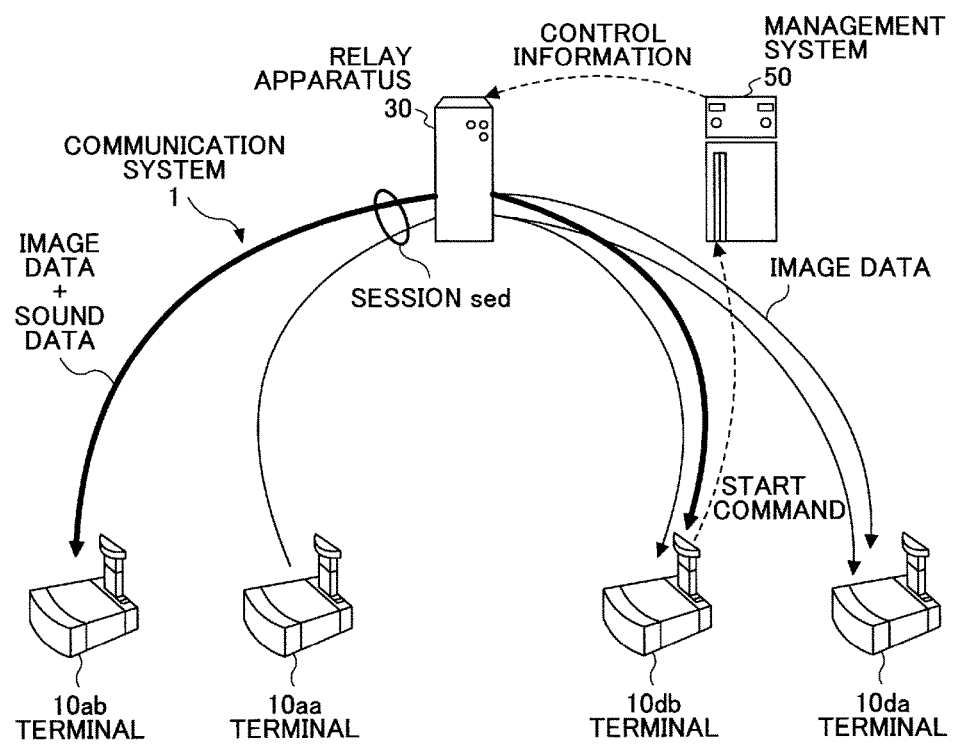

[Fig. 12A]
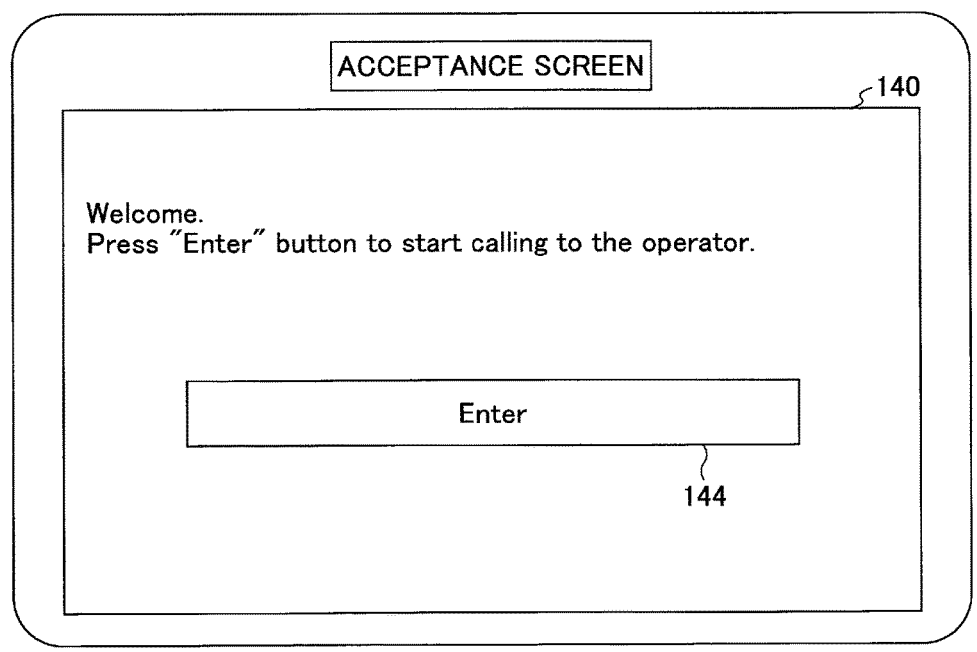

[Fig. 12B]
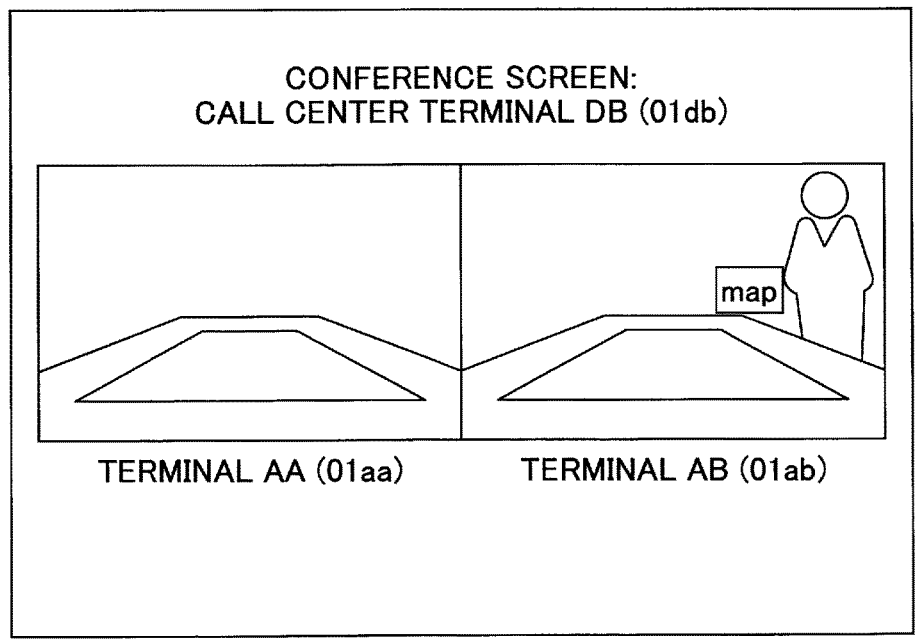

[Fig. 13]
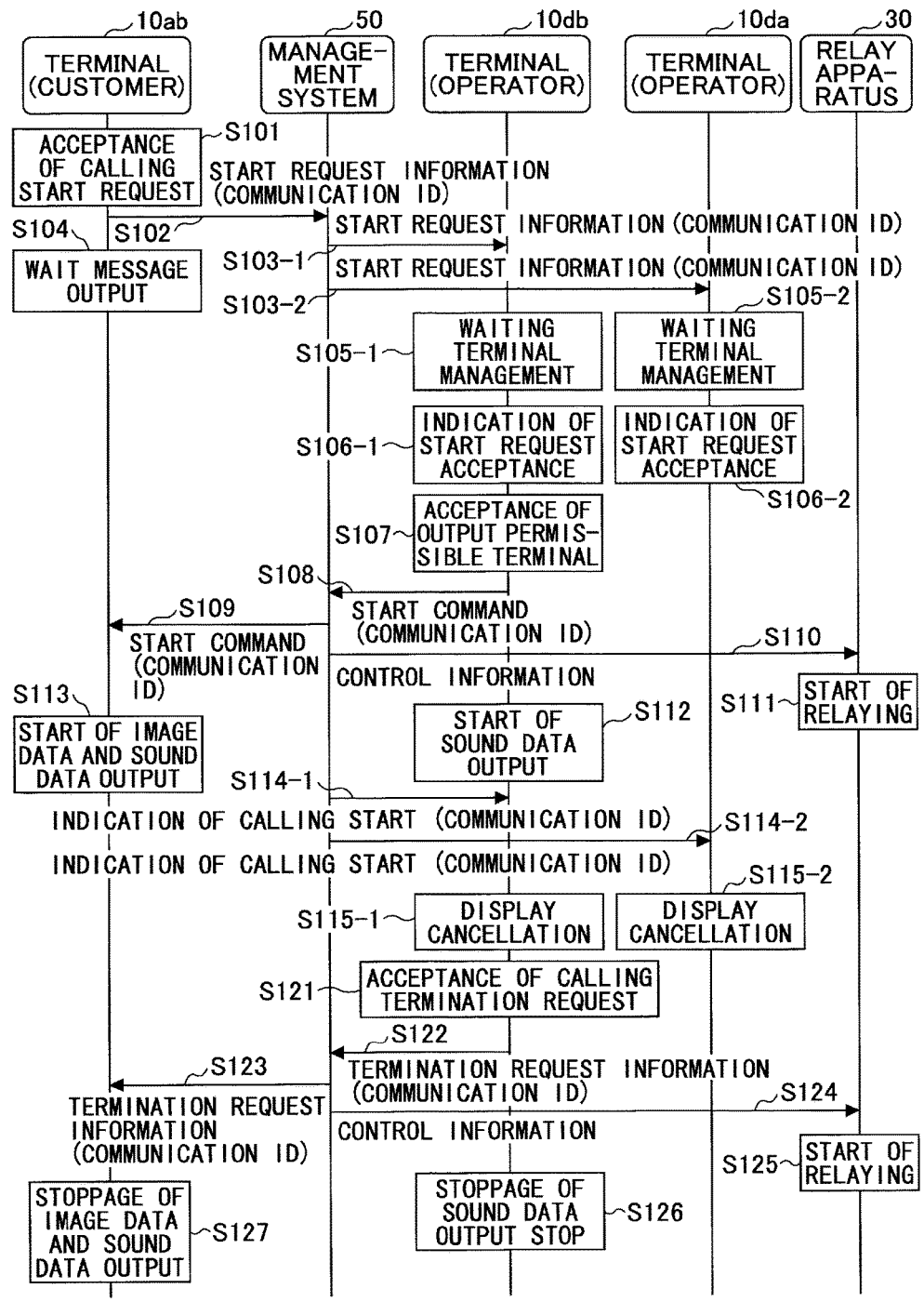

[Fig. 14A]
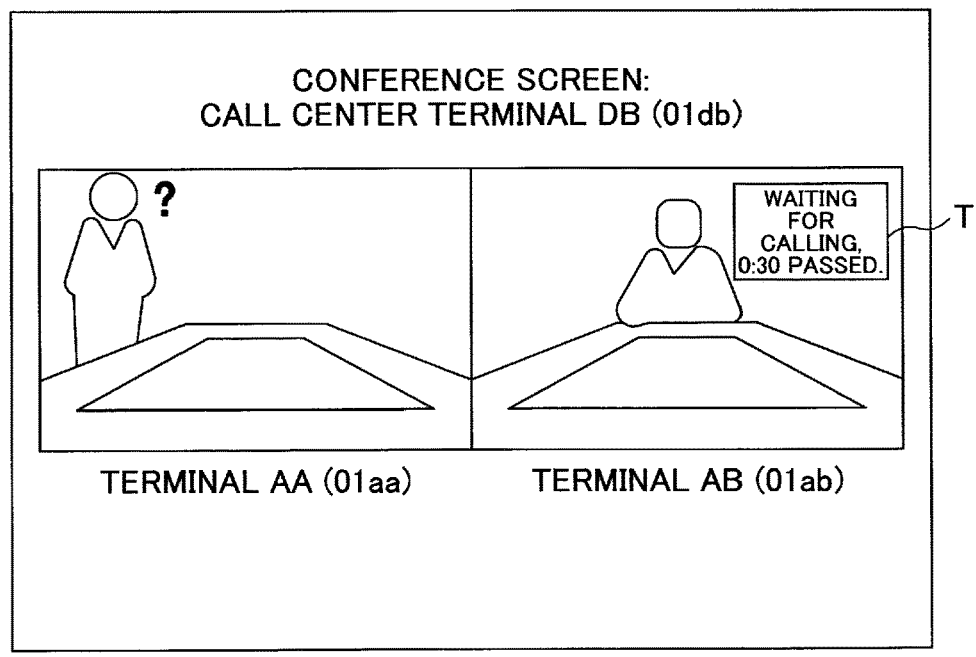
[Fig. 14B]
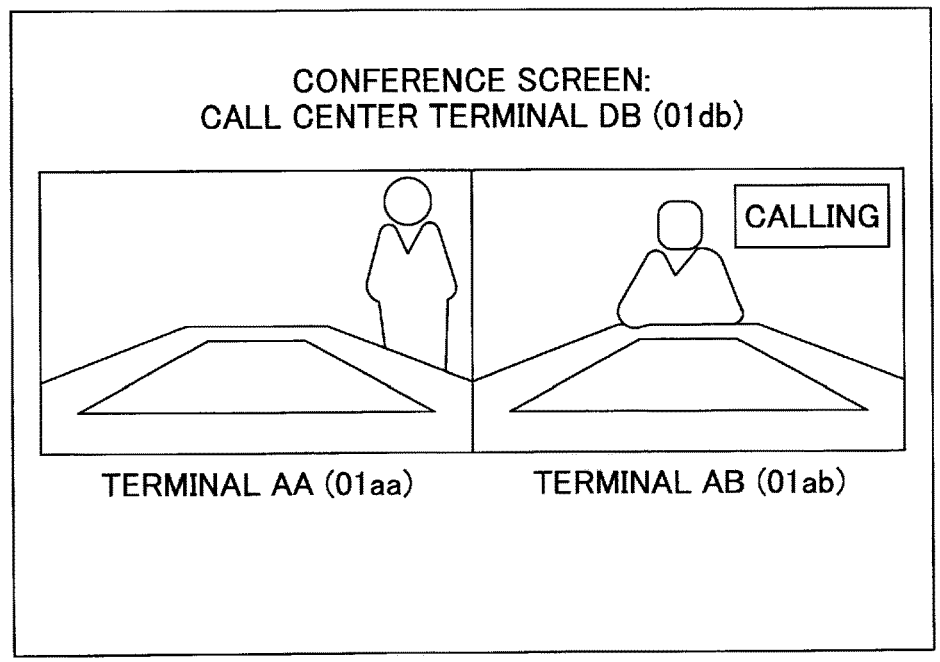

[Fig. 14C]
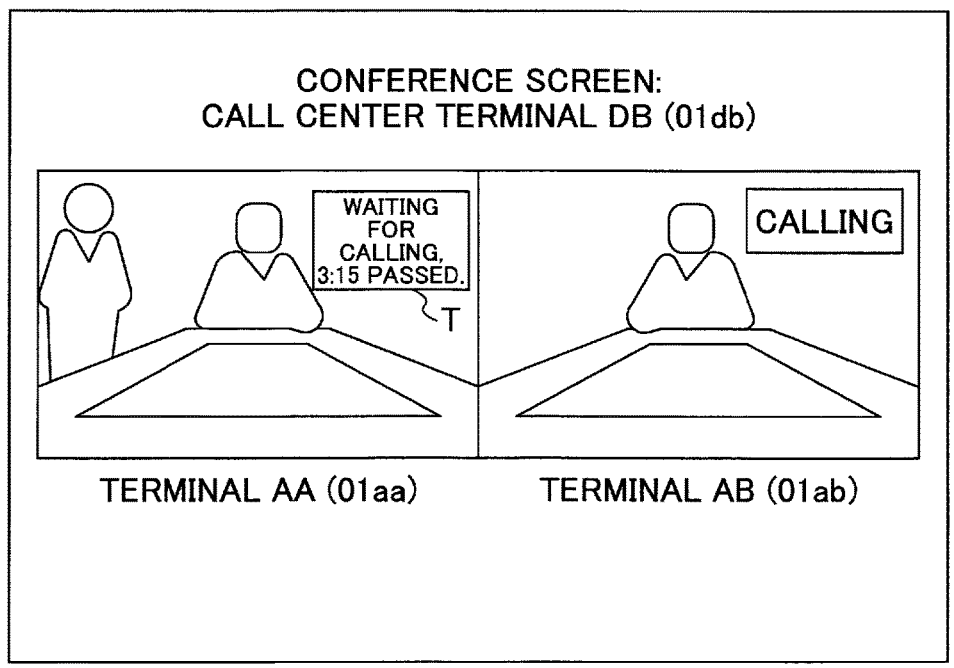

COMMUNICATION MANAGEMENT SYSTEM, COMMUNICATION SYSTEM, COMMUNICATION MANAGEMENT METHOD, AND MEDIUM

TECHNICAL FIELD

The following disclosure generally relates to a communication management system, a communication system, a communication management method, and medium.

BACKGROUND ART

In recent years, in accordance with, for example, a demand for reducing travel cost and time, a communication system which provides calling and conferencing over a communication network such as the Internet or a dedicated line or the like has become popular.

In this kind of communication system, when a communication between communication terminals is started, content data such as image data and audio data are sent and received (see PTL 1).

When using a communication system at a call center, a method is known in which, in response to a connection request from a video phone, a call center apparatus selects a currently available operator terminal to receive a call, and establishes a communication channel for video and audio between the selected operator terminal and the video phone (see PTL 2). This makes it possible for an operator terminal that is in a state in which an incoming call can be received after having terminated communication with a video phone, to start communication with another video phone.

SUMMARY OF INVENTION

Technical Problem

Incidentally, for example, at an actual reception counter, a person in charge of reception can see looks and belongings of a visitor, and may guess the business of the visitor before the visitor reaches the reception counter. However, in communication between communication terminals, there is a problem about usability such that contents on one side cannot be confirmed on a communication terminal on the other side before requesting for communication, and the like.

Solution to Problem

According to an embodiment, a communication management system includes a control unit configured, when communication has been established between one or more communication terminals on one side, and a plurality of communication terminals on another side, to execute control for starting transmission of content data of the respective communication terminals on the one side to the communication terminals on the other side; and a reception unit configured, when the control has been executed for starting the transmission of the content data of the respective communication terminals on the one side to the communication terminals on the other side, to receive start information for starting the transmission of content data of the communication terminal on the other side to one of the communication terminals on the one side, from the communication terminal on the other side. The control unit executes, based on the start information, the control for starting the transmission of the content data of the communication terminal on the other side being a transmission source of the start information, to the communication terminal on the one side.

Advantageous Effects of Invention

An embodiment implemented by the disclosure has an effect that usability can be improved in communication between communication terminals.

BRIEF DESCRIPTION OF DRAWINGS

FIG. 1 is a schematic diagram of a communication system according to an embodiment;

FIG. 2 is an external view of a terminal according to an embodiment;

FIG. 3 is a hardware configuration diagram of a terminal according to an embodiment;

FIG. 4 is a hardware configuration diagram of a management system according to an embodiment;

FIG. 5 is a software configuration diagram of a terminal according to an embodiment;

FIG. 6 is a functional block diagram of a terminal and a management system constituting a part of a communication system according to an embodiment;

FIG. 7A is a schematic view of a table managed by a management system;

FIG. 7B is a schematic view of a table managed by a management system;

FIG. 7C is a schematic view of a table managed by a management system;

FIG. 7D is a schematic view of a table managed by a management system;

FIG. 7E is a schematic view of a table managed by a management system;

FIG. 8 is a sequence chart that illustrates a process starting with activating a terminal, and terminating with displaying an application list;

FIG. 9 is a diagram that illustrates a screen example of an application list;

FIG. 10 is a sequence chart that illustrates a process of requesting for participation in a session;

FIG. 11A is a schematic view that illustrates a state of reception/transmission of various information items in a communication system;

FIG. 11B is a schematic view that illustrates a state of reception/transmission of various information items in a communication system;

FIG. 11C is a schematic view that illustrates a state of reception/transmission of various information items in a communication system;

FIG. 12A is a diagram that illustrates a display example on a display;

FIG. 12B is a diagram that illustrates a display example on a display;

FIG. 13 is a sequence chart that illustrates a process of starting or stopping output of content data;

FIG. 14A is a diagram that illustrates a display example on a display;

FIG. 14B is a diagram that illustrates a display example on a display; and

FIG. 14C is a diagram that illustrates a display example on a display.

DESCRIPTION OF EMBODIMENTS

In the following, referring to the drawings, an embodiment of the present invention will be described in detail. It should be noted that in the following, "communication terminal" may be simply described as "terminal", and "communication management system" may be simply described as "management system".

<<Overall Configuration of Communication System 1>

FIG. 1 is a schematic diagram of a communication system 1 according to an embodiment of the present invention. As shown in FIG. 1, the communication system 1 includes a plurality of terminals (10*aa*, 10*ab*, . . . ), displays (120*aa*, 120*ab*, . . . ) for the terminals (10*aa*, 10*ab*, . . . ), a plurality of relay apparatuses (30*a*, 30*b*, 30*c*, 30*d*, 30*e*), a management system 50, a program providing system 90, and a maintenance system 100. A video conference or the like between remote places can be realized by having communication of image data or audio data as an example of content data performed by the communication system 1. It should be noted that a plurality of routers (70*a*, 70*b*, 70*c*, 70*d*, 70*ab*) select an optimal route of the content data.

The terminals (10*aa*, 10*ab*, 10*ac*, . . . ), the relay apparatus 30*a*, and the router 70*a* are connected to each other and are capable of communicating with each other via a LAN 2*a*. The terminals (10*ba*, 10*bb*, 10*bc*, . . . ), the relay apparatus 30*b*, and the router 70*b* are connected to each other and are capable of communicating with each other via a LAN 2*b*. Further, the LAN 2*a* and the LAN 2*b* are connected to each other and are capable of communicating with each other by a dedicated line 2*ab* including the router 70*ab*. Further, the LAN 2*a*, the LAN 2*b*, and the dedicated line 2*ab* are provided in a predetermined area X. It should be noted that the devices are not necessarily connected to each other by the dedicated line, but may be directly connected to the Internet 2*i*.

The terminals (10*ca*, 10*cb*, 10*cc*, . . . ), the relay apparatus 30*c*, and the router 70*c* are connected to each other and are capable of communicating with each other via a LAN 2*c*. The LAN 2*c* is provided in a predetermined area Y.

The terminals (10*da*, 10*db*, 10*dc*, . . . ), the relay apparatus 30*d*, and the router 70*d* are connected to each other and are capable of communicating with each other via a LAN 2*d*. The LAN 2*d* is provided in a predetermined area Z. The area X, the area Y, and the area Z may be located in the same country or in different countries.

The area X, the area Y, and the area Z are connected to each other and are capable of communicating with each other via the Internet 2*i* through respective routers (70*ab*, 70*c*, 70*d*). It should be noted that a call center is located in the area Z. The terminals 10 can receive a reception service by connecting to the terminals (10*da*, 10*db*, 10*dc*, . . . ) in the call center.

It should be noted that in the following, an arbitrary terminal of the terminals (10*aa*, 10*ab*, . . . ) is described as a "terminal 10", an arbitrary display of the displays (120*aa*, 120*ab*, . . . ) is described as a "display 120", and an arbitrary relay apparatus of the relay apparatuses (30*a*, 30*b*, 30*c*, 30*d*, 30*e*) is described as a "relay apparatus 30". Further, an arbitrary router of the routers (70*a*, 70*b*, 70*c*, 70*d*, 70*ab*) is described as a "router 70".

Further, the management system 50, the program providing system 90, and the maintenance system 100 are connected to the Internet 2*i*. It should be noted that the management system 50, the program providing system 90, and the maintenance system 100 may be located in the areas (X, Y, Z), or may be located in an area other than these areas.

Further, a communication network 2 in the present embodiment includes the LANs (2*a*, 2*b*, 2*c*, 2*d*), the dedicated line 2*ab*, the Internet 2*i*, LAN 2*c*, and the LAN 2*d*. In the communication network 2, there may be an area in which not only wired communication is performed, but also wireless communication such as communication via WiFi (Wireless Fidelity), Bluetooth (registered trade mark), a mobile telephone network or the like is performed.

Further, in FIG. 1, a set of four numbers shown under each terminal 10, each relay apparatus 30, the management system 50, each router 70, the program providing system 90, or the maintenance system 100 illustrates a typical IP address of IPv4 in a simplified manner. Further, instead of IPv4, IPv6 may be used. However, for the sake of simplicity, IPv4 is used in the description.

Further, in each terminal 10, when an application, which will be described later, is started, communications between users become available by sending and receiving content data including audio data or image data. Furthermore, the terminal 10 sends and receives call data by using a predetermined communication method (a call control method for connecting or disconnecting with a destination, and a coding method for IP packetizing the call data). It should be noted that in the following, "application" may be abbreviated as "appli" for short.

Further, as the call control method described above, (1) SIP (Session Initiation Protocol), (2) H.323, (3) enhanced SIP protocol, (4) protocol for instant messenger, (5) protocol utilizing a MESSAGE method of SIP, (6) protocol of Internet Relay Chat (IRC), (7) protocol enhanced from a protocol for instant messenger, or the like, can be listed. The above (4) protocol for instant messenger is a protocol used for, for example, (4-1) Extensible Messaging and Presence Protocol (XMPP), (4-2) ICQ (registered trademark), AIM (registered trademark), or Skype (registered trademark). Further, the above (7) Jingle, for example, is a protocol enhanced from the protocol for instant messenger.

<<Hardware Configuration of the Embodiment>>

Next, a hardware configuration of the present embodiment will be described. FIG. 2 is an external view of a terminal 10 according to an embodiment. As shown in FIG. 2, the terminal 10 includes a housing 1100, an arm 1200, and a camera housing 1300. In a front wall 1120 of the housing 1100, there is an air intake surface 1121 formed with a plurality of air intake holes, and, in a rear wall 1110 of the housing 1100, there is an air exhaust surface formed with a plurality of air exhaust holes. With the above arrangement, by driving a cooling fan embedded in the housing 1100, it becomes possible to take in air in front of the terminal 10 through the air intake surface 1121, and to exhaust the air to the rear of the terminal 10 through the air exhaust surface. Through a sound pickup hole 1131 formed on a right side wall 1130 of the housing 1100, a built-in mike 114, which will be described later, can pick up sound such as voice, sound, noise, etc.

In the right wall 1130 side of the housing 1100, an operation panel 1150 is formed. In the operation panel 1150, there are a plurality of operation buttons (108*a* through 108*e*), a power supply switch 109, and an alarm lamp 119, which will be described later. Also, a sound output surface 1151 is formed in the operation panel 1150, which is formed by a plurality of sound output holes used for passing output sound from a built-in speaker 115, which will be described later. Further, on a part of the housing 1100 close to the left wall 1140, a housing unit 1160 is formed as a concave portion for housing the arm 1200 and the camera housing 1300. On the right wall 1130 of the housing 1100, a plurality of connection ports (1132*a* through 1132*c*) are formed for electrically connecting cables for an external device connection I/F 118, which will be described later. On the other hand, on the left wall 1140 of the housing 1100, a connection port is formed for electrically connecting a cable 120c of a display 120 for a display I/F 117.

It should be noted that in the following, an arbitrary operation button of the operation buttons (108a through 108e) will be described as an "operation button 108", and an arbitrary connection port of the connection ports (1132a through 1132c) will be described as a "connection port 1132".

Next, the arm 1200 is attached to the housing 1100 via a torque hinge 1210, and is capable of rotating in an up-and-down direction within a range of tilt angle θ1 of 135 degrees with respect to the housing 1100. FIG. 2 illustrates a state in which the tilt angle is 90 degrees. In the camera housing 1300, there is a built-in camera 112, which will be described later, and is capable of taking images of a user, a document, a room, etc. Further, in the camera housing 1300, a torque hinge 1310 is formed. Further, the camera housing 1300 is attached to the arm 1200 via the torque hinge 1310. The camera housing 1300 is capable of rotating in a right-and-left direction within a range of +/−180 degrees of pan angle θ2, and rotating in an up-and-down direction within a range of +/−45 degrees of tilt angle θ3, with respect to the arm 1200, assuming that FIG. 2 illustrates a state in which θ2 and θ3 are zero degrees.

It should be noted that an external view of the terminal 10 is not limited to the view shown in FIG. 2, which is just an example. As another example, the terminal 10 may be a general-purpose computer, a mobile phone terminal, a projector, an electronic white board, digital signage, or the like (refer to the terminals (10ac, 10cc) in FIG. 1). When a computer used for the terminal 10 does not include a mike and a camera, an external mike and an external camera can be connected to the computer. Further, in the case where the terminal 10 is a general-purpose computer, a mobile telephone terminal, or the like, the terminal 10 may be connected to the Internet 2i through wireless communication utilizing a wireless LAN, a mobile telephone network, etc. Further, in the case where a general-purpose computer is used as a terminal 10, an application may be installed beforehand which causes the computer to perform processes of the terminal 10 which will be described later.

It should be noted that external views of the management system 50, the program providing system 90, and the maintenance system 100 are the same as an external view of a typical server computer, and thus, descriptions of the external views will be omitted.

FIG. 3 is a hardware configuration of a terminal 10 according to an embodiment. The terminal 10 includes a central processing unit (CPU) 101 for controlling overall operations of the terminal 10; a read only memory (ROM) 102 in which programs used for driving the CPU 101 such as an initial program loader are stored; a random access memory (RAM) 103 which is used for a work area of the CPU 101; a flash memory 104 in which programs for the terminal 10, and various kinds of data including image data, audio data, etc., are stored; a solid state drive (SSD) 105 which controls writing and reading the various data to and from the flash memory 104 according to the control of the CPU 101; a media I/F 107 which controls writing and reading data to and from a recording medium 106 including a flash memory, an integrated circuit (IC) card, etc.; the operation buttons 108 operated for, for example, selecting a destination of the terminal 10; the power supply switch 109 for switching ON/OFF the power supply of the terminal 10; and a network interface (I/F) 111 for performing data transmission by utilizing the communication network 2.

Further, the terminal 10 includes the built-in camera 112 which captures image data by taking an image of a subject according to the control of the CPU 101; an imaging element I/F 113 which controls driving the camera 112; the built-in mike 114 for inputting sound; a built-in speaker 115 for outputting sound; a sound input/output I/F 116 for processing input/output of an audio signal between the mike 114 and the speaker 115 according to the control of the CPU 101; the display I/F 117 for transmitting image data to the external display 120 according to the control of the CPU 101; the external device connection I/F 118 for connecting various external devices; the alarm lamp 119 for indicating an error of various functions of the terminal 10; and a bus line 110 such as an address bus, a data bus, etc., for electrically connecting the above elements as shown in FIG. 3.

The display 120 is a display unit used for displaying a subject image or the like. Examples of the display 120 include a liquid crystal and an organic electroluminescence (EL) panel. Further, the display 120 is connected to the display I/F 117 via the cable 120c. The cable 120c may be a cable for an analog RGB (VGA) signal, a cable for a component video, or a cable for a signal of High-Definition Multimedia Interface (HDMI) (registered trademark) or Digital Video Interactive (DVI).

The camera 112 includes a lens and a solid-state image sensing device to convert light into electric charge for computerizing the subject image, and as the solid-state image sensing device, a Complementary Metal Oxide Semiconductor (CMOS), a Charge Coupled Device (CCD), etc., are used.

To the external device connection I/F 118, via a Universal Serial Bus (USB) cable or the like, which is inserted into the connection port 1132 of the housing 1100, external devices such as an external camera, an external mike, and an external speaker can be electrically connected. In the case where the external camera is connected, according to the control of the CPU 101, priority is given to the external camera to be driven over the built-in camera 112. Similarly, in the case where an external mike is connected or an external speaker is connected, according to the control of the CPU 101, priority is given to the external mike or the external speaker over the built-in mike 114 or the built-in speaker 115, respectively.

It should be noted that the recording medium 106 can be easily attached or detached with the terminal 10. Further, as a non-volatile memory to/from which data are written/read under control of the CPU 101, an Electrically Erasable and Programmable ROM (EEPROM) may be used, not limited to the flash memory 104.

FIG. 4 is a hardware configuration diagram of a management system 50 according to an embodiment. The management system 50 includes a CPU 201 for controlling overall operations of the management system 50; a ROM 202 in which programs used for driving the CPU 201 such as an IPL are stored; a RAM 203 which is used for a work area of the CPU 201; a HD 204 for storing various data including programs for the management system 50, etc.; a hard disk drive (HDD) 205 for controlling various data reading and data writing of the HD 204 according to the control of the CPU 201; a medium I/F 207 for controlling data reading and data writing (storage) of a recording medium 206 including a flash memory; a display 208 for displaying various information items including a cursor, a menu, a window, a character, or an image; a network I/F 209 for performing data communications by using the communication network 2; a keyboard 211 including a plurality of keys for inputting characters, numerical values, various instructions, etc.; a mouse 212 for selecting and executing various instructions, selecting an object to be processed, moving the cursor, or the like; a compact disc read-only memory (CD-ROM) drive 214 for controlling various data reading of a CD-ROM 213 as an example of a detachable recording medium; and a bus line 210 such as an address bus, a data bus, etc., for electrically connecting the above elements as shown in FIG. 4.

On the other hand, the relay apparatus 30, the program providing system 90, and the maintenance system 100 have similar hardware configurations as the above management system 50, and thus, the descriptions will be omitted.

FIG. 5 is a software configuration of the terminal 10 according to an embodiment. As shown in FIG. 5, an OS 1020, a video conference application 1031, and a reception application 1032 are held in a work area 1010 of the RAM 103. The OS 1020 and these applications are installed in the terminal 10.

Further, the OS 1020 provides basic functions, and is basic software which controls the entire terminal 10. The video conference application 1031 is an application for connecting with another terminal 10 and performing a video conference. The reception application 1032 is an application for connecting with a terminal 10 of a call center, and communicating with an operator.

It should be noted that the above applications are just examples, and other applications may be installed. In the case where the other applications are installed, the other applications may be stored in the program providing system 90, and the other applications may be downloaded on demand from the terminal 10. Further, in the case where multiple video conference applications are installed, video conference applications using different protocols such as the above (1) through (7) may be installed.

<<Functional Configuration of Embodiment>>

Next, a functional configuration of the present embodiment will be described. FIG. 6 is a functional block diagram of a terminal 10 and the management system 50 included as a part of the communication system 1 according to the embodiment. It should be noted that in FIG. 6, the terminal 10 and the management 50 are connected to perform data communications via the communication network 2.

<Functional Configuration of Communication Terminal>

The terminal 10 includes a device control unit 1050 and a call control unit 1060. Among these, the device control unit 1050 is implemented by running the OS 1020. Further, the call control unit 1060 is implemented by activating the video-conference application 1031 or the reception application 1032.

Also, the device control unit 1050 includes a sending and receiving unit 11, an operation input receiving unit 12, a display control unit 13, and a storing and reading unit 19. These units are functions realized by elements shown in FIG. 3 that operate by instructions from the CPU 101 which executes an activated application (program) read from the flash memory 104 and loaded on the RAM 103.

On the other hand, the call control unit 1060 includes a sending and receiving unit 21, an activation unit 22, an output control unit 24, a function execution unit 25, and a storing and reading unit 29. These units are functions realized by elements shown in FIG. 3 that operate by instructions from the CPU 101 which executes the video-conference application 1031 or the reception application 1032 (program) read from the flash memory 104 and loaded on the RAM 103.

Further, the terminal 10 includes a memory unit 1000 including the ROM 102, the RAM 103, and the flash memory 104 shown in FIG. 3.

(Functional Configuration of Device Control Unit)

Next, a functional configuration of the device control unit 1050 in the terminal 10 will be described in detail. It should be noted that in the following, when the functional configuration of the device control unit 1050 in the terminal 10 is described, relations between functions and main elements among the elements shown in FIG. 3, which are used for realizing the functions of the device control unit 1050, will also be described.

The sending and receiving unit 11 is realized by instructions from the CPU 101 and the network I/F 111, and performs sending and receiving various data (or information) to and from a terminal, an apparatus, a system, etc., as communication counterparts, via the communication network 2.

The operation input accepting unit 12 is realized by instructions from the CPU 101, the operation buttons (108a, 108b, 108c, 108d, 108e) and the power supply switch 109, and accepts various inputs or various selections made by a user.

The display control unit 13 is realized by instructions from the CPU 101 and the display I/F 117, and controls displaying an image on the display 120.

The storing and reading unit 19 is realized by instructions from the CPU 101 and the SSD 105, or by instructions from the CPU 101, and performs a process of storing various data in the memory unit 1000 and reading the various data stored in the memory unit 1000.

(Functional Configuration of Call Control Unit)

Next, a functional configuration of the call control unit 1060 in the terminal 10 will be described in detail. It should be noted that in the following, when the functional configuration of the call control unit 1060 in the terminal 10 is described, relations between functions and main elements among the elements shown in FIG. 3, which are used for realizing the functions of the call control unit 1060 in the terminal 10, will also be described.

The sending and receiving unit 21 is realized by instructions from the CPU 101 and the network I/F 111, and performs sending and receiving various data (or information) to and from a terminal, an apparatus, a system, etc., as communication counterparts, via the communication network 2.

The activation unit 22 is realized by instructions from the CPU 101, and starts up operations of the call control unit 1060 (the video-conference application or the reception application), based on a request for activation from the operation input accepting unit 12 of the device control unit 1050 when the operation input accepting unit 12 receives a selection of an application by the user.

The output control unit 24 is realized by instructions from the CPU 101 and the display I/F 117, and controls outputting screen data on the display 120. The output control unit 24 is also realized by instructions from the CPU 101 and the sound input/output I/F 116, controls outputting sound from the speaker 115, and inputting sound from the mike 114.

The function execution unit 25 is realized by instructions from the CPU 101, the camera 112, the mike 114 or the speaker 115, etc., and executes control for realizing a call by image or sound.

The storing and reading unit 29 is realized by instructions from the CPU 101 and the SSD 105 or by instructions from the CPU 101, and performs a process of storing various data in the memory unit 1000 and reading the various data stored in the memory unit 1000.

<Functional Configuration of Management System>

The management system 50 includes a sending and receiving unit 51, an authentication unit 52, a management unit 53, a session control unit 58, and a storing and reading unit 59. These units are functions realized by elements shown in FIG. 4 that operate by instructions from the CPU 201 which executes a program for the management system 50 read from the flash memory 204 and loaded on the RAM 203. Further, the management system 50 includes a memory unit 5000 including the HD 204. This memory unit 5000 stores data of application icons for respective application IDs. Furthermore, in the memory unit 5000, databases (DBs) including corresponding tables as described below are included.

(Authentication Management Table)

FIG. 7A is a schematic view illustrating an authentication management table. In the memory unit 5000, an authentication management DB 5001 including the authentication management table as shown in FIG. 7A is included. In the authentication management table, for each communication ID of every terminal 10 managed by the management system 50, the communication ID is associated with a password for authentication and stored to be managed. It should be noted that the communication ID is information for identifying a destination of communication in the communication system 1. The communication ID is not limited specifically, and may be identification information of the terminal 10, account information of a user of the terminal 10, identification information of a group constituted with multiple terminals 10, or the like. In the following, a case will be described where the communication ID is the identification information of the terminal 10, or the identification information of a group. In the following, the descriptions will be continued assuming that communication IDs of the terminals (10aa, 10ab, 10ac, 10db) are "01aa, 01ab, 01ac, 01db", respectively.

(Terminal Management Table)

FIG. 7B is a schematic view illustrating a terminal management table. In the memory unit 5000, a terminal management DB 5002 including the terminal management table as shown in FIG. 7B is included. In the terminal management table, for each communication ID of every terminal 10, a destination name (terminal name) when the terminal 10 is a destination, an operating state of the terminal 10, and an IP address of the terminal 10 are associated with the communication ID, to be managed. It should be noted that an operation state "OFFLINE" indicates a state in which the terminal 10 is not connected to the management system 50. An operation state "ONLINE (READY TO COMMUNICATE)" indicates a state in which the terminal 10 is connected to the management system 50, but not communicating with another terminal 10. An operation state "ONLINE (COMMUNICATING)" indicates a state in which the terminal 10 is connected to the management system 50, and communicating with another terminal 10, but does not bidirectionally transmit content data with the other terminal 10 being the communication partner. An operation state "ONLINE (TALKING)" indicates a state in which the terminal 10 is connected to the management system 50, communicating with another terminal 10, and bidirectionally transmitting content data with the other terminal 10.

(Application use Permission Management Table)

FIG. 7C is a schematic view illustrating an application use permission management table. In the memory unit 5000, an application use permission management DB 5003 including the application use permission management table as shown in FIG. 7C is included. In this application use permission management table, for each communication ID of a terminal 10, and for each application ID which identifies one of multiple applications installed in the terminal 10, use permission information is associated to represent whether the application is usable (On) or not usable (Off) on the terminal 10, and to be managed.

(Session Management Table)

FIG. 7D is a schematic view illustrating a session management table. In the memory unit 5000, a session management DB 5005 including the session management table as shown in FIG. 7D is included. In this session management table, for each session ID that identifies a session in which content data is transmitted between terminals 10, the relay device ID of a relay apparatus 30 that relays content data between the terminals 10 in the session, a communication ID that identifies a group on the operator side participating the session, and a communication ID of a terminal 10 on the customer side being the communication partner of the operator in this session, are associated to be managed.

(Group Information Management Table)

FIG. 7E is a schematic view illustrating a group information management table. In the memory unit 5000, a group information management DB 5010 including the group information management table as shown in FIG. 7E is included. In this group information management table, a communication ID that identifies a group, a destination name (group name) that specifies the group as the destination of communication, and communication IDs of terminals 10 that constitute the group, are associated to be managed.

<Functional Configuration of Management System>

Next, a functional configuration of the management system 50 will be described in detail. It should be noted that in the following, when the functional configuration of the management system 50 is described, relations between functions and main elements among the elements shown in FIG. 4, which are used for realizing the functions of the management system 50, will also be described.

The sending and receiving unit 51 is realized by instructions from the CPU 201 and the network I/F 209, and performs sending and receiving various data (or information) to and from a terminal, an apparatus, or a system via the communication network 2.

The authentication unit 52 is realized by instructions from the CPU 201, searches in the authentication management table by using the communication ID and password received by the sending and receiving unit 51 as a search key, and determines whether the same communication ID and password are managed in the authentication management table, to authenticate the terminal.

The management unit 53 is realized by instructions from the CPU 201, and performs a process of updating an operation state in the terminal management table (see FIG. 7B) in order to reflect the latest operation state.

The session control unit 58 controls a session for sending and receiving content data between the terminals 10, by instructions from the CPU 201. The control includes establishing a session, controlling the terminal 10 to participate in an established session, terminating a session, and controlling transmission of content data in an established session, and the like.

The storing and reading unit 59 is executed by instructions from the CPU 201 and the HDD 205, or realized by instructions from the CPU 201, stores various data in the memory unit 5000, and extracts various data stored in the memory unit 5000.

<<Processes and Operations of Communication System 1>>

Next, processes and operations of the communication system 1 will be described.

First, using FIG. 8, a process will be described that starts with activating the terminal 10*aa*, and terminates with displaying an application list. FIG. 8 is a sequence chart that illustrates the process starting with activating the terminal 10*aa*, and terminating with displaying an application list.

First, when the user turns on the power source switch 109, the operation input accepting unit 12 receives the power-on operation, and activates the terminal 10*aa* (Step S1). In response to receiving the power-on, the sending and receiving unit 11 transmits a login request to the management system 50 via the communication network 2 (Step S2). This makes the sending and receiving unit 51 of the management system 50 receive the login request. This login request includes the communication ID and password to identify the request source, which is the transmission terminal 10*aa*. The communication ID and password are data items that have been read from the memory unit 1000 via the storing and reading unit 19, and transmitted to the sending and receiving unit 11. It should be noted that the communication ID and password may be input by the user of the requesting terminal. By having the login request transmitted from the terminal 10*aa* to the management system 50, the management system 50 on the receiving side can obtain the IP address of the terminal 10*aa* on the sending side.

Next, the authentication unit 52 of the management system 50 searches in the authentication management table (see FIG. 7A) in the memory unit 5000, by using the communication ID and password included in the login request as a search key, and determines whether the same communication ID and password are managed in the authentication management table, for authentication (Step S3). If the login request is authenticated by the authentication unit 52 as a request that comes from a terminal 10 having a valid use permission, the session management unit 53 has the communication ID "01*aa*" of the terminal 10*aa* associate with the operation state "ONLINE (READY TO COMMUNICATE)" and the IP address of the terminal 10*aa*, and stores it in the terminal management table (see FIG. 7B) (Step S4).

Then, the sending and receiving unit 51 of the management system 50 transmits authentication result information that represents an authentication result obtained by the authentication unit 52, to the terminal 10*aa* being the source of the login request via the communication network 2 (Step S5). This makes the sending and receiving unit 11 of the terminal 10*aa* receive the authentication result information.

Once the terminal 10*aa* has been determined by the authentication unit 52 as a terminal having valid use permission, the sending and receiving unit 11 of the terminal 10*aa* sends a request for use permission information that represents use permission of applications installed in the terminal 10*aa*, to the management system 50 via the communication network 2 (Step S6). This request includes the communication ID of the terminal 10*aa* being the source of the request for the use permission information. This makes the sending and receiving unit 51 of the management system 50 receive the request for the use permission information.

Next, the storing and reading unit 59 of the management system 50 searches in the application use permission management table (see FIG. 7C), by using the communication ID of the terminal 10*aa* being the source of the request for the use permission information as a search key, to read corresponding use permission information (Step S7). The use permission information in this case designates that the application ID "a001" is set with "On", and the application ID "a002" is set with "On".

Next, the sending and receiving unit 51 of the management system 50 transmits the use permission information read out at Step S7 to the terminal 10*aa* being the source of the request for the use permission information via the communication network 2 (Step S8). This makes the sending and receiving unit 11 of the terminal 10*aa* receive the use permission information.

Next, the display control unit 13 of the terminal 10*aa* displays a screen 140 of an application list as shown in FIG. 9 on the display 120*aa* (Step S9). Here, FIG. 9 is a diagram that illustrates a screen example of an application list. This screen 140 shows application icons (141, 142, . . . ) that correspond to all of the respective application IDs (a001, a002, . . . ) having the use permission information as usable (On).

Next, a case will be described in which the application icon 142 is selected by a user of the terminal 10*aa*, using FIG. 10. FIG. 10 is a sequence chart that illustrates a process of requesting for participation in a session.

After the user of the terminal 10*aa* has operated the operational buttons (108*a* to 108*e*), and selected the application icon 142 that represents the reception application 1032 among the multiple application icons shown in FIG. 9, the operation input accepting unit 12 of the terminal 10*aa* receives the selection of the application icon by the user (Step S61).

Next, the operation input accepting unit 12 of the device control unit 1050 issues a command to the activation unit 22 implemented by the reception application 1032, to activate the call control unit 1060 that corresponds to the reception application 1032 (Step S62). It should be noted that before this activation, a process has been executed by the device control unit 1050. Once the reception application 1032 has been activated, the process by the call control unit 1060 is now executed.

Next, the sending and receiving unit 21 of the terminal 10*aa* transmits information about a request for participation in the session, which includes the communication ID "01*aa*" of the terminal 10*aa* being the source of the request for participation and the communication ID "01*xx*" of the destination, to the management system 50, along with the IP address of the terminal 10 being the source of the request for participation (Step S72). It should be noted that the communication ID "01*xx*" of the destination is a communication ID that represents the call center as the destination, which has been specified automatically by a process of the sending and receiving unit 21 based on the reception application 1032. Further, the information about a request for participation represents a request for participation in a session in which a terminal 10 included in the call center has been participating.

In the following description, it is assumed that the terminals (10*da*, 10*db*) of the call center that are included in the group identified by the communication ID "01*xx*" have participated in a session sed to transmit content data with other terminals 10 via the relay apparatus 30 at the timing when the terminal 10*aa* made the request for participation.

Next, the management unit 53 changes the operation state associated with the communication ID of the terminal 10*aa* being the source of the start request into "ONLINE (COMMUNICATING)" in the terminal management table (Step S76).

Next, the session control unit 58 adds the communication ID "01*aa*" of the terminal 10*aa* being the source of the request for participation as a field of the customer side in a corresponding record that has the communication ID "01*xx*" as the communication ID of the operator in the session management table (see FIG. 7D) (Step S78). Further, as a part of Step S78, the session control unit 58 searches in the session management table by using the communication ID "01*xx*" as a search key, to read out the corresponding session ID and the relay device ID.

Next, the sending and receiving unit 51 transmits information about relay device connection for connecting to the relay apparatus 30 identified by the relay device ID read out at Step S78, to the terminal 10*aa* being the source of the request for participation (Step S81). This information about relay device connection may include the IP address, authentication information, and a port number of the relay apparatus 30, and the session ID read out at Step S78.

Next, the sending and receiving unit 51 transmits the information about the request for participation that includes the session ID read out at Step S78, to the terminals (10*da*, 10*db*) in the call center identified by the communication ID "01*xx*" (Steps S82-1 and S82-2). In response to the request for participation, the terminals (10*da*, 10*db*) in the call center may automatically transmit responses to the management system 50 that represent permission for participation, respectively. This makes it possible to shorten the time to receive input of permission for participation on the operator side.

The terminal 10*aa* being the source of the request for participation connects to the relay apparatus 30, by using the information about relay device connection transmitted from the management system 50. Thus, the terminal 10*aa* participates in the session sed in which the terminals (10*da*, 10*db*) in the call center have been participating (Step S83). By having the terminals (10*aa*, 10*da*, 10*db*) participated in the common session sed, communication is established between the terminal 10*aa* on the customer side and the terminals (10*da*, 10*db*) on the operator side. The terminals (10*aa*, 10*da*, 10*db*) participating in this session transmit content data (image data and sound data) generated in the respective terminals to the relay apparatus 30.

Once the communication has been established between the terminal 10*aa* on the customer side and the terminals (10*da*, 10*db*) on the operator side, the session control unit 58 of the management system 50 transmits control information for controlling transmission of content data to the relay apparatus 30 via the sending and receiving unit 51 (Step S84). This control information includes the following commands.

The first command is a command to inhibit image data and sound data transmitted by the terminals (10*da*, 10*db*) on the operator side, from being transmitted to the terminal 10*aa* on the customer side. The second command is a command to inhibit sound data among content data transmitted by the terminal 10*aa* on the customer side, from being transmitted to the terminals (10*da*, 10*db*) on the operator side. The third command is a command to start transmitting image data among the content data transmitted by the terminal 10*aa* on the customer side, to the terminals (10*da*, 10*db*) on the operator side.

FIG. 11A is a schematic view that illustrates a state of reception/transmission of various information items in the communication system 1. As shown in FIG. 11A, in response to receiving the control information, the relay apparatus 30 follows the above commands, and starts relaying image data among the content data transmitted from the terminal 10*aa* to the terminals (10*da*, 10*db*)(Step S85). On the terminals (10*da*, 10*db*) on the operator side, the respective output control units 24 start outputting a video on the customer side, based on the image data of the terminal 10*aa* transmitted via the relay apparatus 30 (Steps S86-1 and S86-2). However, the terminals (10*da*, 10*db*) on the operator side cannot start outputting sound of the terminal 10*aa* on the customer side until sound data of the terminal 10*aa* is transmitted via the relay apparatus 30.

The terminal 10*aa* on the customer side cannot start outputting video and sound on the operator side until image data and sound data of the terminal 10*db* are transmitted via the relay apparatus 30. The output control unit 24 of the terminal 10*aa* on the customer side may output a reception screen on the display 120*aa* to receive a request for starting a call with the operator side. FIG. 12A is a diagram that illustrates an example of a reception screen. This screen 140 shows a button 144 to receive a request for starting a call with the operator.

It should be noted that in the present embodiment, the reception application 1032 has been activated on the terminal 10*aa* on the customer side, and an application corresponding to the reception application 1032 on the operator side has been activated on the terminal 10*db* on the operator side. Therefore, the terminals (10*aa*, 10*db*) can start outputting contents at different timings, following the processes of the respective applications.

If the other terminal 10*ab* on the customer side makes a request for participation, substantially the same process as Steps S76 to S87 is executed except that the terminal 10*aa* is replaced with the terminal 10*ab*. Thus, the multiple terminals (10*aa*, 10*ab*) on the customer side and the multiple terminals (10*da*, 10*db*) on the operator side can participate in the common session sed. FIG. 11B is a schematic view that illustrates a state of reception/transmission of various information items in the communication system 1, in which the multiple terminals (10*aa*, 10*ab*) on the customer side and the multiple terminals (10*da*, 10*db*) on the operator side have participated in the common session sed. In FIG. 11B, by having the terminals (10*aa*, 10*ab*, 10*da*, 10*db*) participate in the common session sed, communication is established between the multiple terminals (10*aa*, 10*ab*) on the customer side and the multiple terminals (10*da*, 10*db*) on the operator side.

Once the communication has been established, on the terminals (10*aa*, 10*ab*) on the customer side, reception screens of FIG. 12A are output by processing Step S87, respectively. On the other hand, on the terminals (10*da*, 10*db*) on the operator side, video-conference screens of FIG. 12B are output by processing Steps S86-1 and S86-2, respectively. FIG. 12B is a diagram that illustrates an example of a video-conference screen. In other words, the output control units 24 of the terminals (10*da*, 10*db*) on the operator side control starting output of image data of the terminals (10*aa*, 10*ab*) on the customer side transmitted via the relay apparatus 30, on the displays (120*da*, 120*db*), respectively. As shown in FIG. 12B, if a new customer appears in the capturing ranges of the cameras 112 of the terminals (10*aa*, 10*ab*), the operator of the terminals (10*da*, 10*db*) can confirm looks of the customer before the new customer makes a request for a call. Here, for example, if a customer having a map appears on the screen of the terminal 10*ab*, the operator may expect that the customer will ask how to get to a destination location in the next call. Also, if a customer having a pamphlet of a language appears on the screen of the terminal 10*ab*, the operator may expect that the customer will ask a question in the language in the next call.

Thus, the operator can prepare for the next call depending on a circumstance that can be grasped from a screen on the customer side.

Next, using FIG. 13, a process will be described in which the terminal 10*ab* on the customer side receives a request for starting a call with the operator side. FIG. 13 is a sequence chart that illustrates a process of starting or stopping output of content data. If a customer presses the button 144 on the reception screen of FIG. 12A at the terminal 10*ab*, the function execution unit 25 receives a request for starting a call (Step S101). Next, the sending and receiving unit 21 of the terminal 10*ab* transmits information about the request for starting a call that includes the communication ID "01*ab*" of the terminal 10*ab* being the source of the request for starting a call, and the communication ID "01*xx*" of the destination, to the management system 50 (Step S102). It should be noted that a request for starting a call may be regarded as a request for obtaining content data on the operator side, by the terminal 10*ab* on the customer side.

In response to receiving the information about the start request transmitted from the terminal 10*ab* on the customer side, the sending and receiving unit 51 of the management system 50 transmits the received information about the start request to the terminals (10*da*, 10*db*) on the operator side (Steps S103-1 and S103-2).

After having transmitted the information about the start request, the terminal 10*ab* on the customer side has the output control unit 24 switch the output image on the display 120*ab* from the reception screen for the start request to a message asking for waiting until the call becomes ready to start (Step S104). This can avoid receiving a duplicated request for starting a call.

In response to receiving the information about the start request by the respective sending and receiving units 21 of the terminals (10*da*, 10*db*) on the operator side, the function execution unit 25 manages the terminal 10 being the source of the request for starting the call (Steps S105-1 and S105-2). In this case, the function execution unit 25 associates the reception time of the start request with the communication ID of the terminal 10*ab* being the source of the start request, and stores it in the memory unit 1000 via the storing and reading unit 29.

Next, the output control units of 24 of the terminals (10*da*, 10*db*) on the operator side associate image data of the terminal 10*ab* being the source of the start request, with a message for indicating that the start request of the terminal 10*ab* has been received, and output it on the displays (120*da*, 120*db*), respectively (Steps S106-1 and S106-2). FIG. 14A is a diagram that illustrates an example of a video-conference screen. As shown in FIG. 14A, the output control units 24 of the terminals (10*da*, 10*db*) may output the elapsed time since the reception time of the start request managed in the memory unit 1000, by associating the elapsed time with corresponding image data on the terminal 10*ab* side being the source of the start request.

When the operator of the terminal 10*db* side becomes ready for the call, in response to operational input by the operator, the operation input accepting unit 12 of the terminal 10*db* receives a designation of a terminal 10 among the terminals (10*aa*, 10*ab*) on the customer side that transmit content data to the terminal 10*db*, on which output of content data of the terminal 10*db* is to be permitted (Step S107). In this case, the designation is not limited to the terminal 10*ab* that has transmitted the start request, but the operation input accepting unit 12 may receive a designation of the terminal 10*aa* that has not transmitted the start request. For example, if a video on the terminal 10*aa* side is being output, in which a customer does not seem to understand the operational method of making a request for starting a call (see FIG. 14A), the terminal 10*aa* may be designated on the operator side so that the operator can start a call with the customer of the terminal 10*aa* side.

In the following, description will continue for a case in which the terminal 10*ab* is designated as a terminal 10 on which output of content data of the terminal is to be permitted. Once the designation of a terminal 10 on which output of content data of the terminal is to be permitted has been received, the sending and receiving unit 21 of the terminal 10*db* transmits a start command that represents a command to start transmitting the content data of the terminal itself to the terminal 10 on which output of the content data of the terminal itself is permitted, to the management system 50 (Step S108). The start command includes the communication ID of the terminal 10*db* that has permitted the start, and the communication ID of the permitted terminal 10*ab*.

In response to receiving the start command of the terminal 10*db* on the operator side, the sending and receiving unit 51 of the management system 50 transmits the received start command to the terminal 10*ab* on which output is permitted (Step S109). This makes the sending and receiving unit 21 of the terminal 10*ab* receive the start command.

Once the start command has been transmitted/received between the terminals (10*ab*, 10*db*), the session control unit 58 of the management system 50 transmits control information to control transmitting content data to the relay apparatus 30 via the sending and receiving unit 51 (Step S110). This control information includes the following commands.

The first command is a command to start transmitting image data and sound data transmitted from the terminal 10*db* on the operator side to the terminal 10*ab*. The second command is a command to start transmitting sound data transmitted from the terminal 10*ab* on the customer side to the terminal 10*db*.

FIG. 11C is a schematic view that illustrates a state of reception/transmission of various information items in the communication system 1. As shown in FIG. 11C, in response to receiving the control information, the relay apparatus 30 follows the commands, and starts relaying the image data and sound data transmitted from the terminal 10*db* to the terminal 10*ab* (Step S111). Also, following the above commands, the relay apparatus 30 starts relaying the sound data transmitted from the terminal 10*aa* to the terminal 10*ab* (Step S111).

On the terminal 10*db* on the operator side, the output control unit 24 starts outputting the sound data of the terminal 10*aa* on the customer side newly transmitted via the relay apparatus 30, in addition to the image data on the customer side that has been already output (Step S112). On the terminal 10*ab* on the customer side, the output control unit 24 outputs the image data and sound data of the terminal 10*db* newly transmitted via the relay apparatus 30 (Step S113). Once the video based on the image data and the sound based on the sound data of the partner side are started being output on the terminals (10*ab*, 10*db*), talking can be started between the operator and the customer.

As a part of Step S112, the output control unit 24 of the terminal 10*db* associates the image data of the terminal 10*ab* on which output of the content is permitted, with a message indicating that the call is being processed, and outputs the message on the display 120*db*. FIG. 14B is a diagram that illustrates an example of a video-conference screen. As shown in FIG. 14B, the operator can grasp which one of the multiple customers he/she is calling.

After having transmitted the control information at Step S110, the sending and receiving unit 51 of the management system 50 transmits a call start indication that represents the call has been started between the terminals (10*ab*, 10*db*) to the terminals (10*da*, 10*db*) on the operator side (Steps S114-1 and S114-2). The call start indication includes the communication ID "01*ab*" of the terminal 10*ab* on the customer side on which output of the content data of the terminal 10*db* on the operator side has been permitted.

On the terminals (10*da*, 10*db*) having received the call start indication, the output control units 24 release displaying the indication of reception of the start request (see Steps S106-1 and S106-2) that has been associated with the image data of the terminal 10*ab* (Steps S115-1 and S115-2). This makes it possible for the operators to grasp which one of the operators the customer of the terminal 10*ab* side has started calling. At this moment, the storing and reading units 29 of the terminals (10*da*, 10*db*) on the operator side may delete the communication ID of the terminal 10*ab* being the source of the request for starting the call, and the reception time of the start request that have been stored in the memory unit 1000. Thus, customer queues can be managed precisely at the terminals 10 on the operator side.

Next, if a request for starting a call is received at the other terminal 10*aa* on the customer side, substantially the same process as Steps S101 to S106-1 or S106-2 is executed except that the terminal 10*ab* is replaced with the terminal 10*aa*. On the terminals (10*da*, 10*db*) on the operator side, Steps S106-1 and S106-2 associate the image data of the terminal 10*aa* being the source of the start request, with a message for indicating the reception of the start request of the terminal 10*aa* side, and output the message on the displays (120*da*, 120*db*), respectively. FIG. 14C is a diagram that illustrates an example of a video-conference screen on the terminal 10*db*. As shown in FIG. 14C, the operator can confirm a state of the terminal 10*aa* side waiting for calling while calling with the customer of the terminal 10*ab* side. Thus, the operator may make a decision to terminate the call with the customer of the terminal 10*ab* side early.

When terminating the call, depending on operational input by the user, the operation input accepting unit 12 of the terminal 10*db* receives a request for terminating the call with the customer of the terminal 10*ab* side (Step S121).

Once the request for terminating the call has been received by the terminal 10*db*, the sending and receiving unit 21 transmits information about the request for terminating, to request to stop outputting the content data of the terminal 10*db* on the terminal 10*ab*, to the management system 50 (Step S122). The information about the request for termination includes the communication ID of the terminal 10*db* requesting to stop outputting, and the communication ID of the terminal 10*ab* being the destination of the request.

In response to receiving the information about the request for termination from the terminal 10*db* on the operator side, the sending and receiving unit 51 of the management system 50 transmits the received information about the request for termination to the terminal 10*ab* being the destination of the request (Step S123).

Once the information about the request for termination has been transmitted/received between the terminals (10*ab*, 10*db*), the session control unit 58 of the management system 50 transmits control information to control transmitting content data to the relay apparatus 30 via the sending and receiving unit 51 (Step S124). This control information includes the following commands.

The first command is a command to stop transmitting the image data and sound data transmitted from the terminal 10*db* on the operator side to the terminal 10*ab* on the customer side. The second command is a command to stop transmitting the sound data transmitted from the terminal 10*ab* on the customer side to the terminal 10*db* on the operator side.

In response to receiving the control information, the relay apparatus 30 follows the above commands, and stops relaying the image data and sound data transmitted from the terminal 10*db* to the terminal 10*ab* (Step S125). Further, the relay apparatus 30 follows the above commands, and stops relaying the sound data transmitted from the terminal 10*ab* to the terminal 10*db* (Step S125). Since the sound data is not transmitted anymore from the terminal 10*ab* on the customer side, on the terminal 10*db* on the operator side, the output control unit 24 stops outputting the sound on the customer side (Step S126). However, since the image data of the terminal 10*ab* on the customer side continues to be transmitted to the terminal 10*db* on the operator side via the relay apparatus 30, the output control unit 24 can continue to output the video of the customer side. On the other hand, since the image data and sound data of the terminal 10*db* are not transmitted anymore to the terminal 10*ab* on the customer side, the output control unit 24 stops outputting the video and sound of the operator side. Once outputting the sound of the partner side has been stopped on the terminals (10*ab*, 10*db*), the call cannot be performed between the operator and the customer.

When the above process has completed, the terminal 10*db* may receive a permission to output the content data of the terminal itself on a terminal 10 on the customer side, for example, the terminal 10*aa* or the like. This process is similar to Step S107 described above, and the description is omitted.

It should be noted that although in the above embodiment, a process has been described in which a call is started and terminated between the terminal 10*db* side and the terminal 10*ab* side, the present invention is not limited to such a process. A process in which a call is started and terminated with the terminal 10*da* side or the terminal 10*aa* side is the same as the above process except that the terminal 10*db* is replaced with the terminal 10*da*, and the terminal 10*ab* is replaced with the terminal 10*aa*, and hence, the description is omitted.

<<Effect of Embodiment>>

According to the communication management method in the above embodiment, the session control unit 58 of the management system 50 (an example of a control unit) executes, once communication has been established between one or more terminals 10 on the customer side (an example of a communication terminal on one side) and multiple terminals 10 on the operator side (an example of a communication terminal on another side), control for starting transmission of content data of the terminal 10 on the customer side to the terminals 10 on the operator side. After the control has been executed to start transmitting content data of the terminal 10 on the customer side to the terminals 10 on the operator side, the sending and receiving unit 51 of the management system 50 (an example of a reception unit) receives a start command to start transmitting content data of the terminal 10 on the operator side, to one of the terminals 10 on the customer side (an example of start information), by receiving it from the terminal 10 on the operator side (an example of receiving). Based on the start command, the session control unit 58 of the management system 50 executes control for starting the transmission of content data of the terminal 10 on the operator side being the source of transmission of the start command, to the terminal 10 on the customer side (an example of a controlling). According to the method, the operator can confirm looks of the customer, based on the content data on the customer side before making a request for starting a call. Thus, the operator can guess content of the call from the looks of the customer, and hence, usability of the communication system 1 is improved.

The sending and receiving unit 51 of the management system 50 further receives information about the start request that represents a request for starting a call with the operator side, from the terminal 10 on the customer side. The sending and receiving unit 51 of the management system 50 (an example of a transmitter unit) transmits this information about the start request to the terminals 10 on the operator side, to indicate the reception of the request for starting a call from the customer side (an example of a transmitting). Based on the start request, the output control units 24 of the terminals 10 on the operator side (examples of a display control unit) display the information that represents the reception of the request for starting a call by the terminal 10 on the customer side (an example of a display control process), respectively. Thus, the request for starting a call by the customer can be transferred to the operators.

The memory unit 1000 of the terminal 10 on the operator side manages the reception time when the request for starting a call was received from the terminal 10 on the customer side. Based on the reception time managed in the memory unit 1000, the output control unit 24 of the terminal 10 on the operator side displays the elapsed time since the reception of the request for starting a call. Therefore, if receiving requests for starting a call from multiple terminals 10 on the customer side, the operator can select one of the terminals 10 on the customer side as a call partner that has the longest elapsed time since the reception of the request for starting a call.

After the control has been executed to start transmitting content data of the terminal 10 on the operator side to one of the terminals 10 on the customer side, the sending and receiving unit 51 of the management system 50 transmits a call start indication indicating that the terminal 10 on the customer side becomes ready to start a call, to the terminals 10 on the operator side. Based on the call start, the output control units 24 of the terminals on the operator side stop displaying information representing the reception of the request for starting a call by the terminal 10 on the customer side, respectively. Thus, a customer waiting for starting a call with the operator can be managed precisely by a process of the terminal 10 on the operator side.

<<Supplementary Description of Embodiments>>

It should be noted that the management system 50 and the program providing system 90 in the above embodiments may be constituted with a single computer, or constituted with multiple computers to which corresponding units (functions or means) are arbitrarily partitioned and assigned. Further, if the program providing system 90 is constituted with a single computer, a program transmitted by the program providing system 90 may be transmitted by partitioning the program into multiple modules, or may be transmitted without partitioning. Furthermore, if the program providing system 90 is constituted with multiple computers, a program may be transmitted from the computers in a state where the program is partitioned into multiple modules.

Further, a recording medium in which a terminal program, a relay apparatus program, and a communication management program of the communication system 1 are stored, an HD 204 in which the above programs are stored, and the program providing system 90 including the HD 204 can be provided as program products for domestic or overseas users of the terminal program, the relay apparatus program, and the communication management program.

Furthermore, although in the communication system 1, the IP address of a terminal is managed in the terminal management table shown in FIG. 7B, it is not limited to that, but respective FQDNs (Fully Qualified Domain Names) may be managed as long as they are terminal identification information to identify the respective terminals 10 on the communication network 2. In this case, the IP address corresponding to a FQDN is obtained by a known DNS (Domain Name System) server.

In the communication system 1, the "video conference" is used as a term which can be replaced by "TV conference".

Further, in the above communication system 1, as an example of the communication system 1, a case of a video conference system has been described, but it is not limited to that, but may be a car navigation system. In this case, for example, one terminal 10 corresponds to a car navigation device installed in an automobile, and another terminal 10 corresponds to a management terminal or a management server in a management center that manages car navigation, or a car navigation device that is installed on another automobile.

Furthermore, the communication system 1 may be an audio conference system or a personal computer (PC) screen sharing system. Further, the communication system 1 may be a communication system for Internet protocol (IP) telephones, Internet telephones, or mobile telephones. In the above cases, for example, the terminal 10 corresponds to a telephone such as a mobile telephone terminal.

Also, content data may be sound data generated in a body such as pulse sound or heartbeats, image data that represents a waveform of an electrocardiogram or change of the body temperature, or coordinates data that represents information in the body. Thus, the communication system 1 of the embodiment can be used as a remote medical system.

Also, although image data and sound data have been described as examples of content data in the above embodiment, it is not limited to that, but may be tactile sensation (touch) data. In this case, sensation of touch by a user on one terminal side is transferred to the other terminal side. Furthermore, content data may be olfactory sensation (smell) data. In this case, sensation of smell on one terminal side is transferred to the other terminal side. Further, content data may be streaming data (medium) at least one of data items among image data, sound data, tactile sensation data, and olfactory sensation data.

It should be noted that the terminals 10 may be used not only for a call between multiple offices, and a call between different rooms in the same office, but also for a call in the same room, and a call between the outdoors and indoors or between the outdoors and outdoors. If the terminals 10 are used outdoors, wireless communication may be executed through a cellular phone communication network or the like. Further, although a case of a video-conference by the communication system 1 has been described in the above embodiment, but it is not limited to that; the communication system may be used for a meeting, ordinary conversation between family members of friends, or presentation of information in one direction.

Further, the present invention is not limited to these embodiments and examples described above, but various variations and modifications may be made without departing from the scope of the present invention.

The present application is based on and claims the benefit of priority of Japanese Priority Application No. 2015-145701 filed on Jul. 23, 2015, with the Japanese Patent Office, the entire contents of which are hereby incorporated by reference.

CITATION LIST

Patent Literature

PTL 1: Japanese Laid-open Patent Publication No. 2012-191598
PTL 2: Japanese Laid-open Patent Publication No. 2005-064860

REFERENCE SIGNS LIST 10 terminal
11 sending and receiving unit
12 operation input accepting unit
13 display control unit
19 storing and reading unit
21 sending and receiving unit
22 activation unit
24 output control unit
25 function execution unit
29 storing and reading unit
30 relay apparatus
50 management system
51 sending and receiving unit
52 authentication unit
53 management unit
58 session control unit
59 storing and reading unit
5000 memory unit
5001 authentication management DB
5002 terminal management DB
5003 application use permission management DB
5005 session management DB
5010 group information management DB

The invention claimed is:

1. A communication management system, comprising:
a control circuit configured to, after communication has been established between one or more communication terminals on one side, and a plurality of communication terminals on another side, execute control for transmitting initial content data of the communication terminals on the one side to the communication terminals on the other side, without executing control for transmitting operator content data to the communication terminals on the one side;
a receiver configured to, when the control has been executed for transmitting the initial content data of the communication terminals on the one side to the communication terminals on the other side, receive start information for starting the transmission of the operator content data of the communication terminal on the other side to one of the communication terminals on the one side, from the communication terminal on the other side, wherein the receiver further receives a request for starting a call with the other side from the communication terminal on the one side; and
a transmitter configured to transmit an indication of a reception of the request for starting a call from the one side, to the communication terminals on the other side;
wherein the control circuit executes, based on the start information, control for starting the transmission of the operator content data of the communication terminal on the other side being a transmission source of the start information, to the communication terminal on the one side, and
after the control has been executed for starting the transmission of the operator content data of the communication terminal on the other side being the transmission source of the start information, to the communication terminal on the one side, the transmitter transmits an indication that the communication terminal on the one side has become ready to start calling, to the communication terminals on the other side.

2. A communication system, comprising:
the communication management system as claimed in claim 1;
the one or more communication terminals on the one side; and
the plurality of communication terminals on the other side.

3. A communication system, comprising:
the communication management system as claimed in claim 1;
the one or more communication terminals on the one side; and
the plurality of communication terminals on the other side,
wherein each of the communication terminals on the other side includes a display control circuit configured to display information that represents the reception of the request for starting a call from the communication terminal on the one side, based on the indication of the reception of the request for starting the call from the communication terminal on the one side.

4. A communication system, comprising:
the communication management system as claimed in claim 1;
the one or more communication terminals on the one side; and
the plurality of communication terminals on the other side,
wherein each of the communication terminals on the other side includes a display control circuit configured to display information that represents the reception of the request for starting the call from the communication terminal on the one side, based on the indication of the reception of the request for starting the call from the communication terminal on the one side, and to stop displaying the information, based on the indication that the communication terminal on the one side has become ready to start calling.

5. The communication system as claimed in claim 3, wherein each of the communication terminals on the other side manages a reception time at which the request for starting a call from the communication terminal on the one side was received,
wherein the display control circuit of each of the communication terminals on the other side displays an elapsed time since the request for starting the call has been received, based on the reception time being managed.

6. A communication management method executed by a communication management system, the method comprising:
executing, after communication has been established between one or more communication terminals on one side and a plurality of communication terminals on another side, control for transmitting initial content data of the communication terminals on the one side to the communication terminals on the other side, without executing control for transmitting operator content data to the communication terminals on the one side;

receiving, when the control has been executed for transmitting the initial content data of the communication terminals on the one side to the communication terminals on the other side, start information for starting the transmission of operator content data of the communication terminal on the other side to one of the communication terminals on the one side, from the communication terminal on the other side; receiving a request for starting a call with the other side from the communication terminal on the one side;

transmitting an indication of a reception of the request for starting a call from the one side, to the communication terminals on the other side;

executing, based on the start information, control for starting the transmission of the operator content data of the communication terminal on the other side being a transmission source of the start information, to the communication terminal on the one side; and after the control has been executed for starting the transmission of the operator content data of the communication terminal on the other side being the transmission source of the start information, to the communication terminal on the one side, transmitting an indication that the communication terminal on the one side has become ready to start calling, to the communication terminals on the other side.

7. The communication management method as claimed in claim 6, the method further comprising:

receiving a request for starting a call with the other side from the communication terminal on the one side; and transmitting an indication of a reception of the request for starting a call from the one side to the communication terminal on the other side, wherein each of the communication terminals on the other side executes a display control process to display information that represents the reception of the request for starting the call from the one side, based on the indication of the reception of the request for starting the call from the one side.

8. A non-transitory computer-readable recording medium having a program stored therein for causing a communication management system to execute a process, the process comprising:

executing, after communication has been established between one or more communication terminals on one side and a plurality of communication terminals on another side, control for transmitting initial content data of the communication terminals on the one side to the communication terminals on the other side, without executing control for transmitting operator content data to the communication terminals on the one side;

receiving, when the control has been executed for transmitting the initial content data of the communication terminals on the one side to the communication terminals on the other side, start information for starting the transmission of operator content data of the communication terminal on the other side to one of the communication terminals on the one side, from the communication terminal on the other side;

receiving a request for starting a call with the other side from the communication terminal on the one side;

transmitting an indication of a reception of the request for starting a call from the one side, to the communication terminals on the other side;

executing, based on the start information, control for starting the transmission of the operator content data of the communication terminal on the other side being a transmission source of the start information, to the communication terminal on the one side; and after the control has been executed for starting the transmission of the operator content data of the communication terminal on the other side being the transmission source of the start information, to the communication terminal on the one side, transmitting an indication that the communication terminal on the one side has become ready to start calling, to the communication terminals on the other side.

9. The communication management system of claim 1, wherein the control circuit is configured to execute control for transmitting initial content data, which is image data, but not audio data, of the communication terminals on the one side.

* * * * *